United States Patent
Matsubara et al.

(10) Patent No.: US 9,201,601 B2
(45) Date of Patent: Dec. 1, 2015

(54) REDUCING REQUIRED BATTERY CAPACITY FOR DATA BACKUP IN A STORAGE SYSTEM WITH MULTIPLE CONTROLLERS

(71) Applicant: Hitachi, Ltd., Tokyo (JP)

(72) Inventors: Ryosuke Matsubara, Tokyo (JP); Hiroki Kanai, Tokyo (JP); Toru Maeda, Tokyo (JP)

(73) Assignee: HITACHI, LTD., Tokyo (JP)

( * ) Notice: Subject to any disclaimer, the term of this patent is extended or adjusted under 35 U.S.C. 154(b) by 104 days.

(21) Appl. No.: 14/234,017

(22) PCT Filed: May 30, 2013

(86) PCT No.: PCT/JP2013/064990
§ 371 (c)(1),
(2) Date: Jan. 21, 2014

(87) PCT Pub. No.: WO2014/192113
PCT Pub. Date: Dec. 4, 2014

(65) Prior Publication Data
US 2015/0293714 A1  Oct. 15, 2015

(51) Int. Cl.
*G06F 3/06* (2006.01)
*G06F 12/02* (2006.01)
*G06F 13/12* (2006.01)
*G06F 12/08* (2006.01)

(52) U.S. Cl.
CPC .............. *G06F 3/0619* (2013.01); *G06F 3/065* (2013.01); *G06F 3/0653* (2013.01); *G06F 3/0685* (2013.01); *G06F 12/0238* (2013.01); *G06F 12/0868* (2013.01); *G06F 13/124* (2013.01); *G06F 2003/0691* (2013.01)

(58) Field of Classification Search
CPC .......... G06F 3/0625; G06F 2003/0691; G06F 11/0727; G06F 12/0238; G06F 12/0866; G06F 12/0868; G06F 12/0871; G06F 13/12; G06F 13/124; G06F 13/1673
See application file for complete search history.

(56) References Cited

U.S. PATENT DOCUMENTS 8,261,032 B2  9/2012 Takahashi
2009/0077312 A1  3/2009 Miura

FOREIGN PATENT DOCUMENTS

| JP | 2001-034535 A | 2/2001 |
| JP | 2004-118644 A | 4/2004 |
| JP | 2009-003789 A | 1/2009 |
| JP | 2009-075759 A | 4/2009 |
| JP | 4977554 B2 | 4/2012 |
| JP | 2012-164194 A | 8/2012 |

*Primary Examiner* — Hal Schnee
(74) *Attorney, Agent, or Firm* — Volpe and Koenig, P.C.

(57) ABSTRACT

A storage system which is connected to a host computer, includes a storage device; a first controller which controls data transfers between the storage device and the host computer; a second controller connected to the first controller and controls data transfers between the storage device and the host computer; a non-volatile memory; and a battery device. The first controller includes a first volatile memory and the second controller comprising a second volatile memory. Upon a power outage, the battery device starts supplying electric power to the first controller and the second controller, and wherein the second controller copies data which is stored in the first volatile memory to the second volatile memory and, after copying is complete, stops operation of the first controller, stops the power supply from the battery device to the first controller, and copies data.

15 Claims, 20 Drawing Sheets

Fig.2
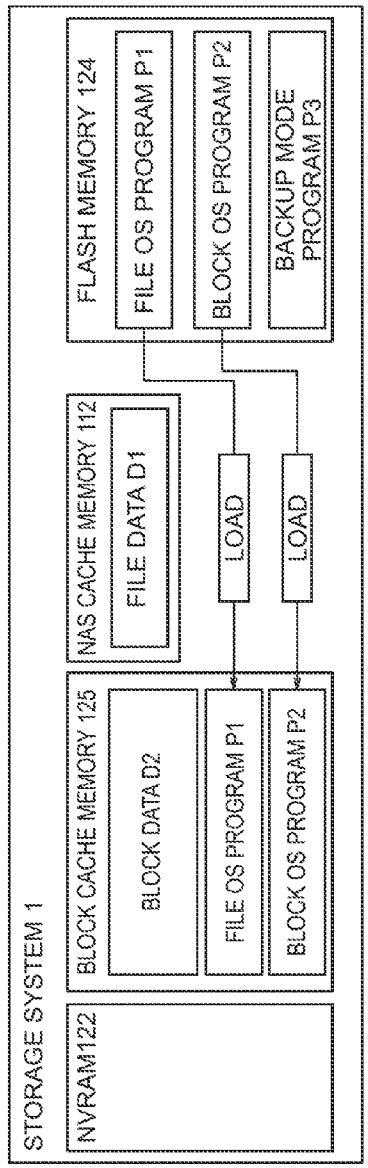
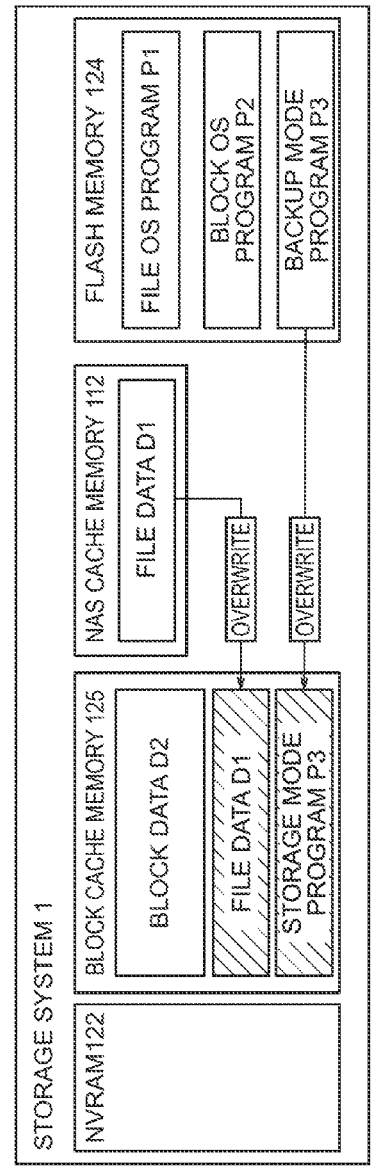

Fig.7A

| ADDRESS | LOG NAME |
|---|---|
| 0 × 00 | BLOCK DATA BACKUP LOG L1 |
| 0 × 20 | BLOCK DATA BACKUP LOG L1 |
| ... | BLOCK DATA BACKUP LOG N11 |
| 0 × 100 | FILE DATA BACKUP LOG L11 |
| 0 × 120 | FILE DATA BACKUP LOG L12 |
| ... | FILE DATA BACKUP LOG N12 |
| 0 × 200 | SERVER DATA BACKUP LOG L21 |
| 0 × 220 | SERVER DATA BACKUP LOG L22 |
| ... | SERVER DATA BACKUP LOG N13 |
| 0 × 300 | SOMETHING DATA BACKUP LOG L31 |
| 0 × 320 | SOMETHING DATA BACKUP LOG L32 |
| ... | SOMETHING DATA BACKUP LOG N14 |

| BIT | SYMBOL | VALUE |
|---|---|---|
| 63 | Valid | 0 : INVALID<br>1 : VALID |
| 62:16 | Base Address | ××× |
| 15 | Dirty Only | 1: DIRTY DATA ONLY<br>0: ALL DATA |
| 14 | NVRAM | 1: STORED IN NVRAM<br>0: EXISTS IN CACHE MEMORY |
| 13:11 | Error | 111: DATA FAILURE DURING STORAGE<br>000: STORAGE COMPLETED NORMALLY |
| 10:0 | Size | 1 [GB] |

L1
L11  L12  L13

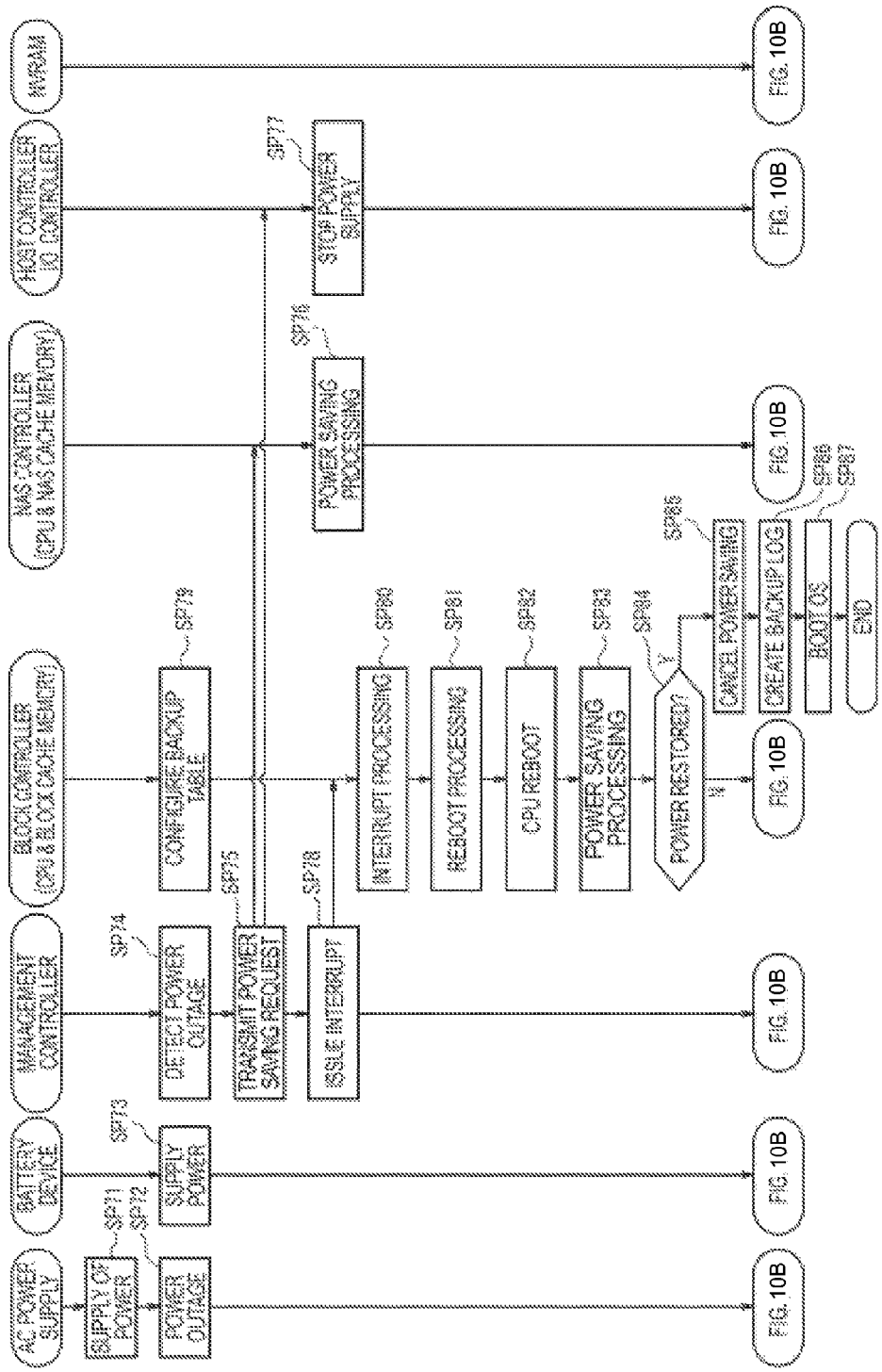

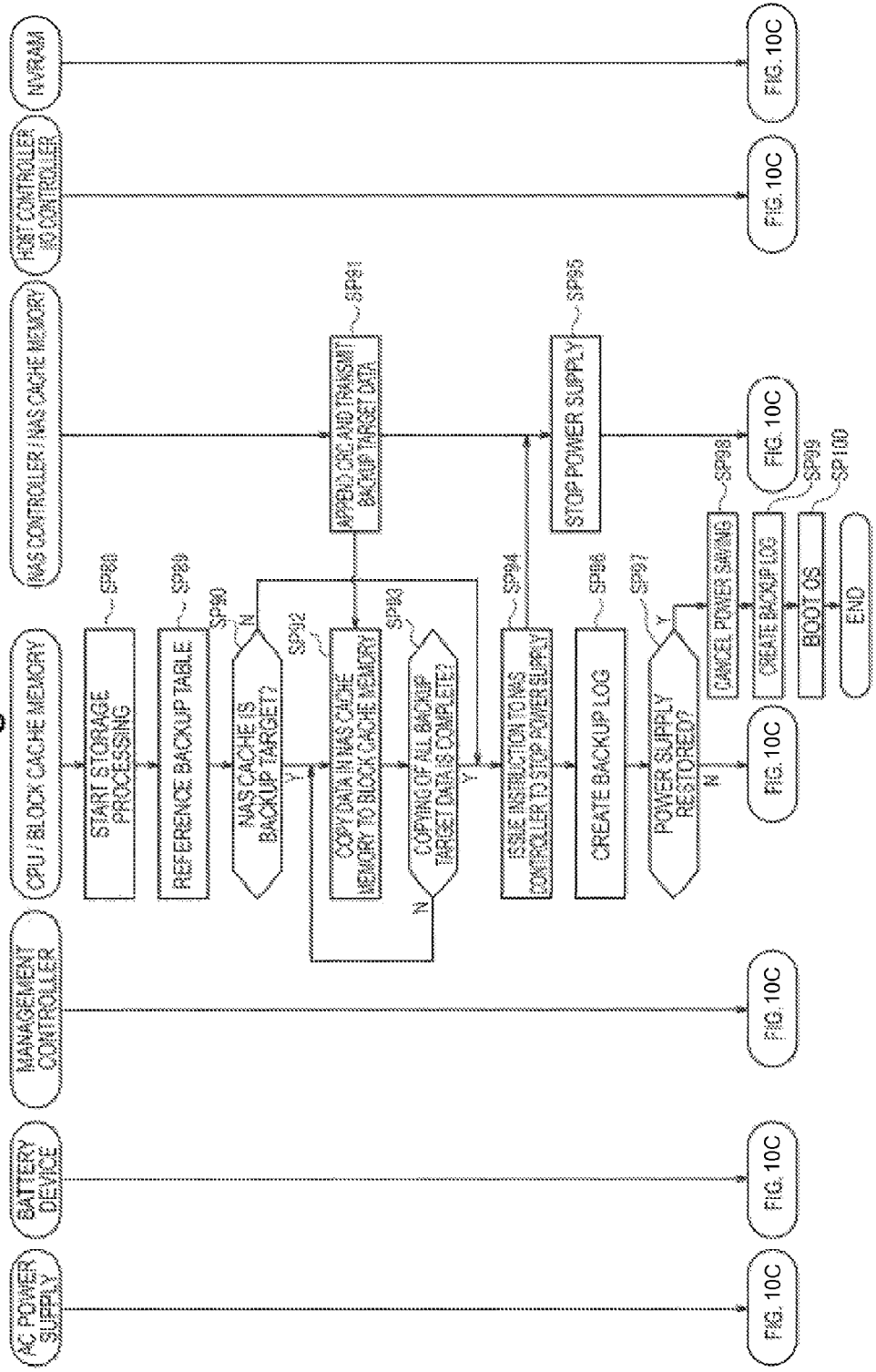

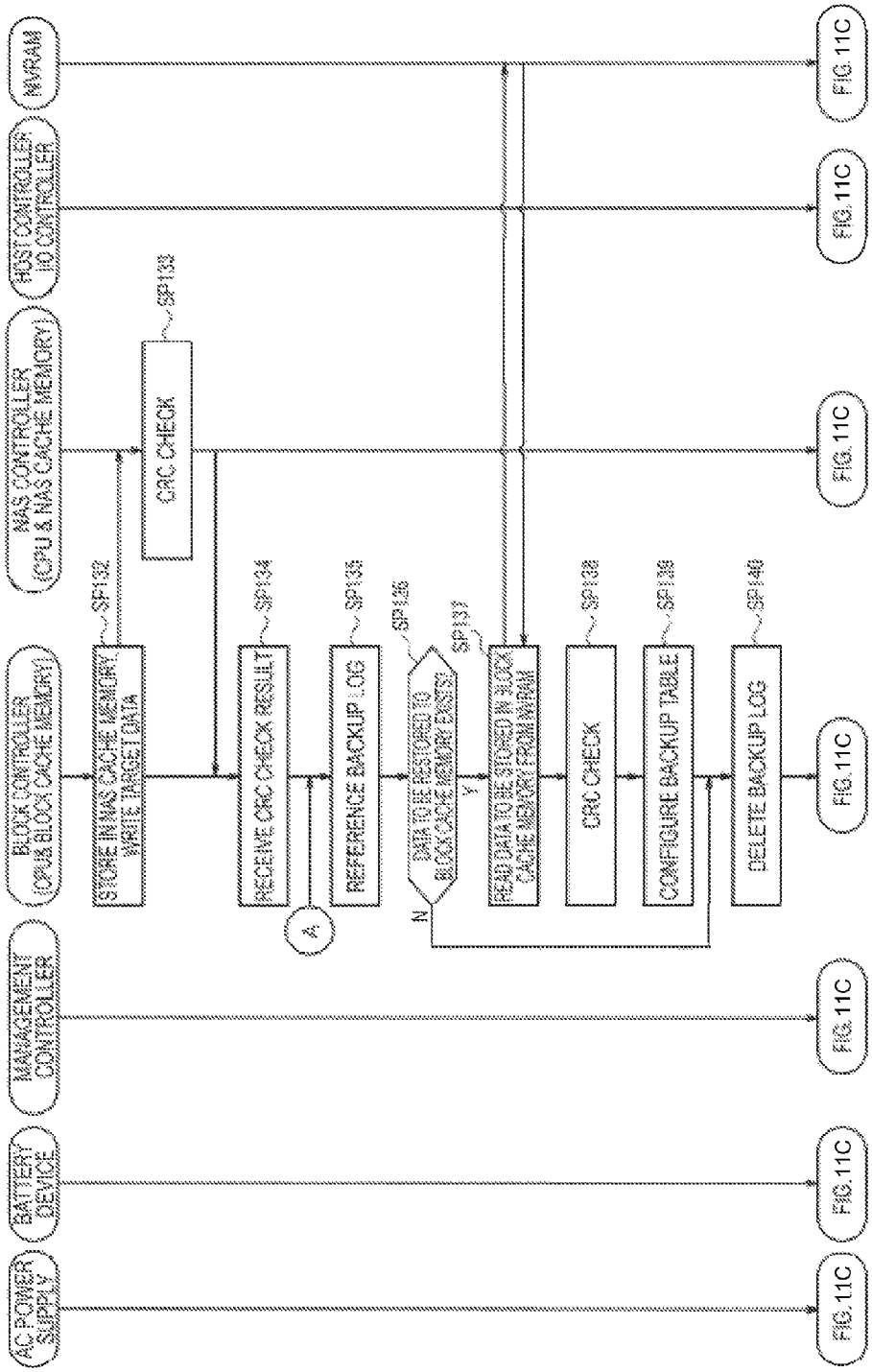

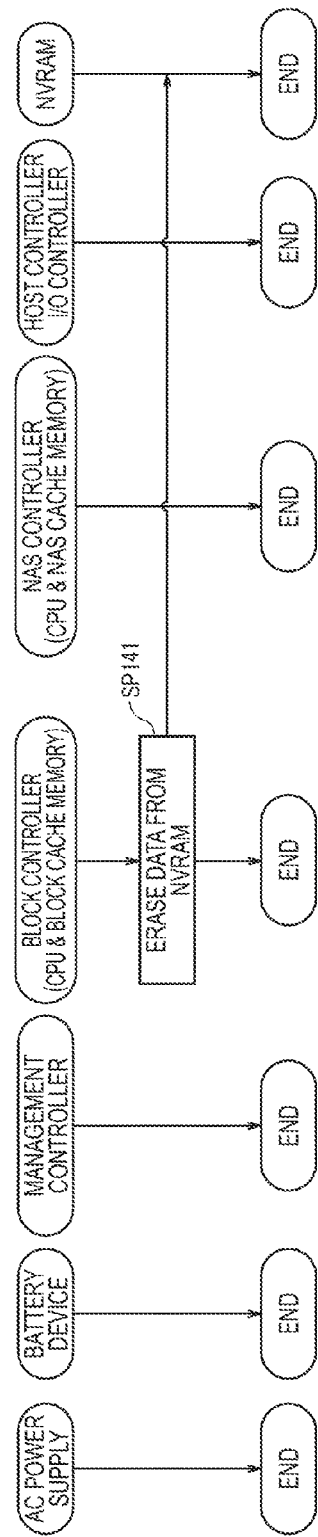

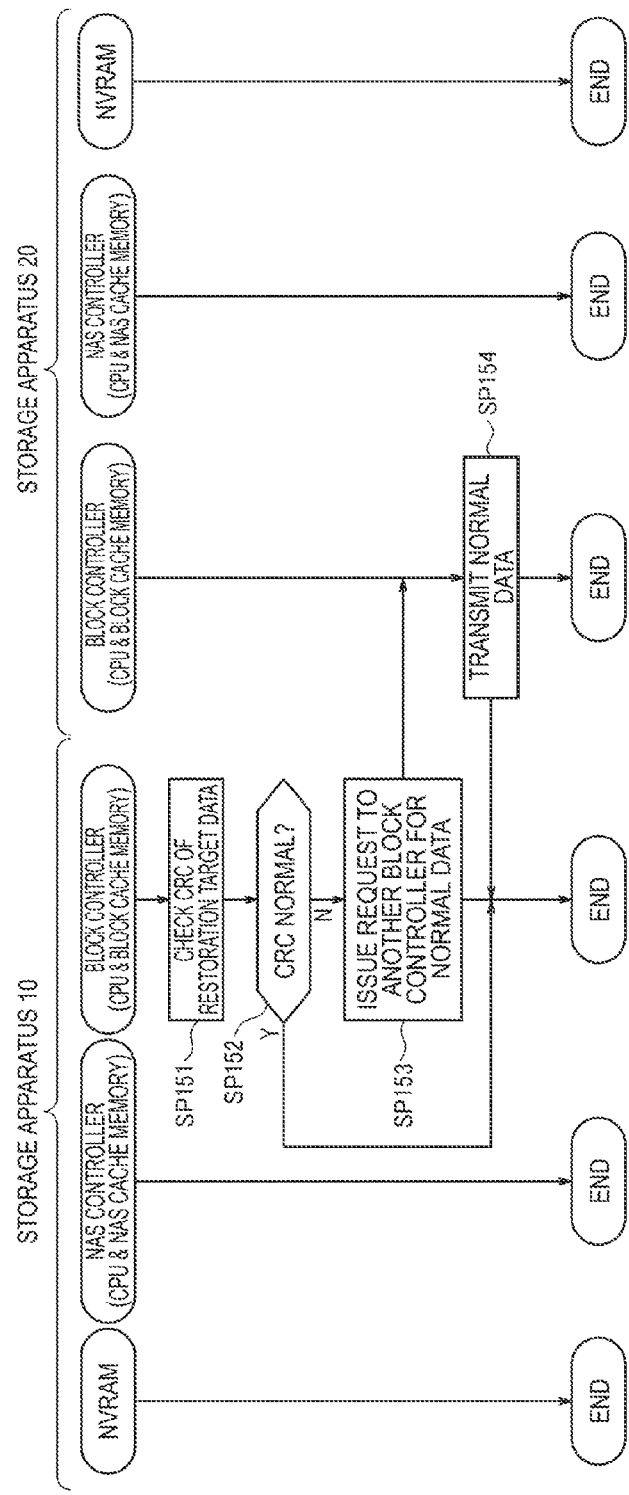

REDUCING REQUIRED BATTERY CAPACITY FOR DATA BACKUP IN A STORAGE SYSTEM WITH MULTIPLE CONTROLLERS

TECHNICAL FIELD

The present invention relates to a storage system and a data backup method, and more particularly relates to a storage system and a data backup method with which data stored in a volatile memory is saved to a non-volatile memory upon a power outage.

BACKGROUND ART

Conventionally, there exist storage systems which absorb a difference between the processing speed of a host computer and the processing speed of a storage device through the insertion of a cache memory, which is a volatile memory, in data transfers between the host computer and the storage device.

Typically, a storage system is configured comprising a controller and a storage device for storing data which are connected to the host computer. Upon receiving a data write request and write data from the host computer, the controller writes the write data in the cache memory and transmits a write completion notification (ACK) to the host computer. Thereafter, the controller transfers write data which is written in the cache memory to the storage device asynchronously to I/Os from the host computer.

Meanwhile, upon receiving a read request from the host computer, the controller does not access the storage device if the read data is stored in the cache memory, and reads the read data from the cache memory and transfers the read data to the host computer. The controller reads read data from the storage device and transfers this data to the host computer only in cases where read data is not stored in the cache memory.

In a storage system, control is performed such that, by using a cache memory in the foregoing manner, the processing speed of the storage device has no impact on the tasks of the host computer even in a case where the processing speed of the storage device is slow in comparison with the processing speed of the host computer.

Here, upon receiving the ACK from the controller, the host computer determines that data has been written in the storage device without problems and erases the write data from the memory in the host computer. However, in reality, in a case where the power of the storage system is disconnected for whatever reason during the period when the data transfer from the cache memory in the controller to the storage device is still incomplete, the write data which has been written in the cache memory is lost. Even when the power supply is restored, the lost write data is difficult to reproduce.

Therefore, as one example of a countermeasure to protect write data which has been written in the cache memory, there exists a data saving method for saving data to a non-volatile memory (see PTL 1 and PTL 2).

PTL 1 and PTL 2 disclose a method in which write data which has been written in a cache memory, which is volatile memory, is saved to non-volatile memory upon a power outage, and the write data which has been saved to the non-volatile memory is restored to the cache memory when power is restored. This method makes it possible to prevent loss of write data which has been written in a cache memory upon a power outage, but which has not yet been written in the storage device.

CITATION LIST

Patent Literature

[PTL 1]
Japanese Patent No. 4977554
[PTL 2]
JP-A-2009-75759

SUMMARY OF INVENTION

Technical Problem

However, in the case of the storage systems disclosed in PTL 1 and PTL 2, a plurality of controllers are each configured comprising a cache memory and a non-volatile memory, and a configuration is adopted with which, when a power outage occurs, data in the cache memory which each controller comprises is saved to the non-volatile memory of each controller.

Therefore, in a case where data is saved to a non-volatile memory when the power supply is disconnected, there needs to be a supply of electric power to the plurality of controllers controlling the data saving during the time from the power outage until the data saving is complete, and hence it is necessary to install a battery device in each controller. Accordingly, the larger the scale of the storage system, the greater the amount of electric power required for the data saving, and a large capacity battery device then becomes necessary. As a result, the battery device is a large-scale device.

The present invention was conceived in view of the points above, and proposes a storage system and a data backup method which enable the downsizing of a battery device.

Solution to Problem

In order to solve the foregoing problem, the storage system according to the present invention is a storage system which is connected to a host computer, comprising: a storage device; a first controller which controls data transfers between the storage device and the host computer; a second controller which is connected to the first controller and which controls data transfers between the storage device and the host computer; a non-volatile memory; and a battery device, wherein the first controller comprises a first volatile memory and the second controller comprises a second volatile memory, wherein, upon a power outage, the battery device starts supplying electric power to the first controller and the second controller, and wherein the second controller copies data which is stored in the first volatile memory to the second volatile memory and, after copying is complete, stops operation of the first controller, stops the power supply to the first controller, and copies data which is stored in the second volatile memory to the non-volatile memory.

Furthermore, in order to solve the foregoing problem, the data backup method of the present invention is a data backup method of a storage system which is connected to a host computer, the storage system comprising a storage device; a first controller which controls data transfers between the storage device and the host computer; a second controller which is connected to the first controller and which controls data transfers between the storage device and the host computer; a non-volatile memory; and a battery device, wherein the first controller comprises a first volatile memory and the second controller comprises a second volatile memory, the backup method comprising, upon a power outage, a first step in which the battery device starts supplying electric power to the first controller and the second controller; and a second step in which the second controller copies data which is stored in the first volatile memory to the second volatile memory and, after copying is complete, stops operation of the first controller, stops the power supply to the first controller, and copies data which is stored in the second volatile memory to the non-volatile memory.

Advantageous Effects of Invention

The present invention enables a battery device contained in a storage system to be downsized.

BRIEF DESCRIPTION OF DRAWINGS

FIG. 2 is a conceptual view illustrating a method of securing a cache area at the time of data saving.

FIG. 7A is a conceptual view of a backup log.

FIG. 7B is a conceptual view of a backup log.

FIG. 10A is a flowchart showing data saving processing upon a power outage.

FIG. 10B is a flowchart showing data saving processing upon a power outage.

FIG. 11B is a flowchart showing data restoration processing upon a power outage.

FIG. 11C is a flowchart showing data restoration processing upon a power outage.

FIG. 11D is a flowchart showing data restoration processing at the time of a data failure.

DESCRIPTION OF EMBODIMENTS

An embodiment of the present invention will be described in detail hereinbelow with reference to the drawings.

(1) First Embodiment (1-1) Overview of Embodiment

Figure 1:
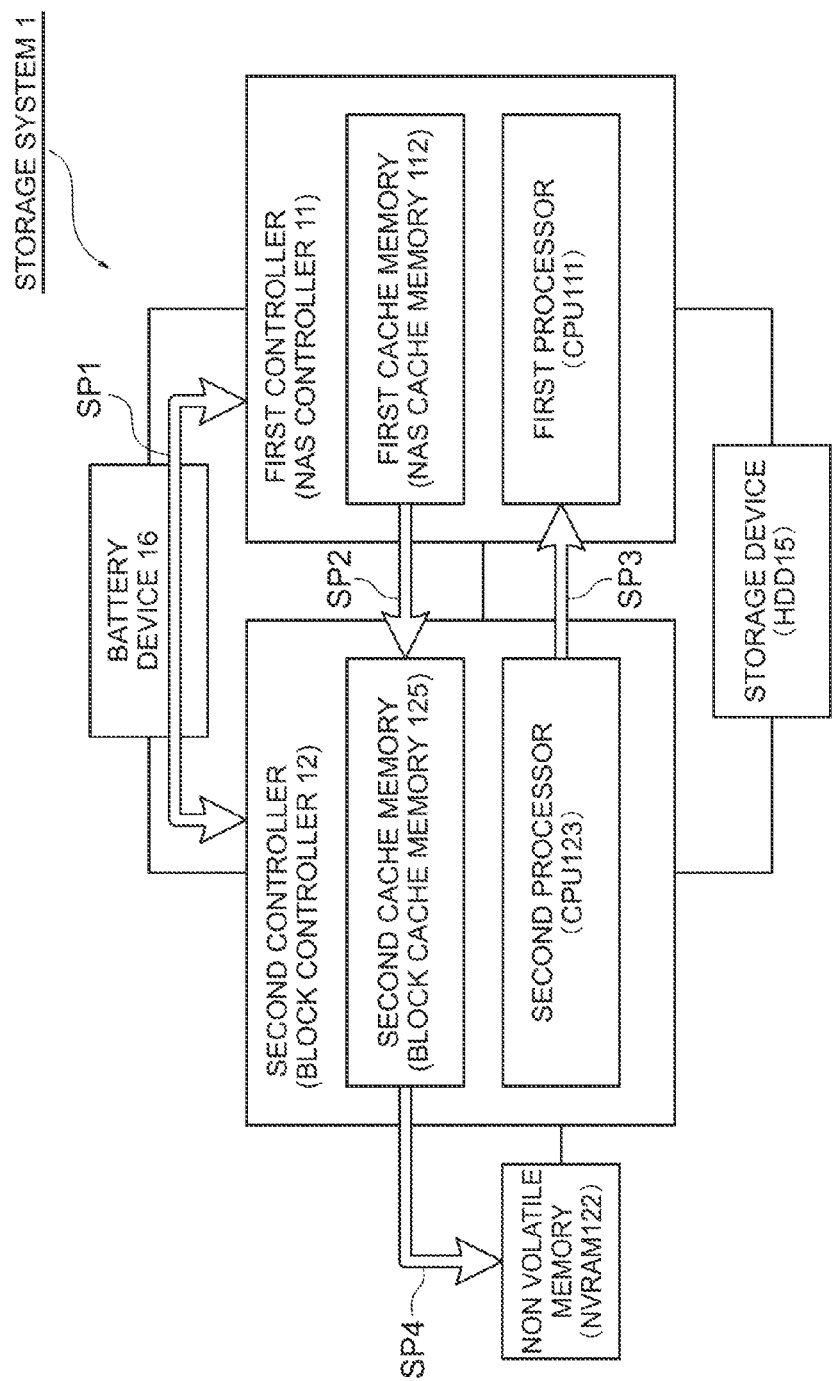
FIG. 1 is a conceptual view illustrating a data saving method according to the present embodiment.

FIG. 1 is a conceptual view illustrating a data saving method according to the present embodiment. According to this embodiment, a configuration is adopted whereby, if a power outage occurs in a storage system which comprises a plurality of controllers, data held by another controller in a cache memory which any one controller among the plurality of controllers comprises is aggregated and the aggregated data is batch-saved to one non-volatile memory, whereby, in comparison with a case where a plurality of controllers each individually save data to a non-volatile memory, the time and amount of electric power required for the data saving are reduced, thereby enabling the battery device contained in the storage system to be downsized.

More specifically, a storage system 1 according to this embodiment is configured comprising a battery device 16, a first controller (NAS: Network Attached Storage controller 11), a second controller (block controller 12), and a non-volatile memory (NVRAM: Non Volatile RAM 122). The battery device 16, the NAS controller 11, the block controller 12, and the NVRAM 122 execute the following processing upon a power outage.

First, the battery device 16 starts supplying electric power to the NAS controller 11 and the block controller 12 in cases where the power supplied to the storage system 1 is disconnected for any reason (SP1).

The NAS controller 11 then causes the block controller 12 to save the data stored in the first cache memory (NAS cache memory 112) to a second cache memory (block cache memory 125) which the block controller 12 comprises (SP2).

Typically, the data transfer between the cache memories takes place at a higher speed than the data transfer between the cache memory and the non-volatile memory. It is thus possible to perform a high-speed transfer of data from the NAS cache memory 112 to the block cache memory 125 and, after the transfer is complete, stop the supply of power to the NAS controller 11.

When all the data stored in the NAS cache memory 112 has been saved to the block cache memory 125, the block controller 12 determines that power does not need to be supplied to the NAS controller 11 by the battery device 16 and instructs the NAS controller 11 to stop the power supply (SP3).

Upon receiving an instruction to stop the power supply from the block controller 12, the NAS controller 11 stops the power supply. Since it is possible to stop the supply of power at the moment there is no need for power to be supplied by the battery device 16, the power of the battery device 16 can be conserved.

Finally, the block controller 12 saves all the data aggregated in the block cache memory 125 to the NVRAM 122 (SP4) and ends the data saving processing according to this embodiment.

Thus, according to this embodiment, each of the plurality of controllers does not individually save data to the non-volatile memory from the cache memory, rather, the configuration is such that the saved data is aggregated in the cache memory which any of the controllers of the plurality of controllers comprises and the aggregated data is batch-saved to a non-volatile memory, and such that the power supplies of the other controllers for which data saving to the one controller is complete is stopped in order, and therefore the time and electric power required to save to the non-volatile memory can be reduced.

Accordingly, with this embodiment, the battery device installed in the storage system 1 can be downsized.

FIG. 2 is a conceptual view illustrating a method of securing a cache area in data saving processing. With this embodiment, a configuration is adopted in which data held by another controller in a cache memory which any one controller among a plurality of controllers comprises is aggregated and the aggregated data is batch-saved to one non-volatile memory, and hence a cache area in which the data can be aggregated at an aggregation destination must be secured.

The top part of FIG. 2 shows a normal configuration when power is being supplied normally to the storage system 1. Normally, the block cache memory 125 stores block data D2, a file OS program P1, and a block OS program P2.

Note that the block data D2 is user data whose transfer in block units is controlled by the block controller 12. The file OS program P1 is a program for controlling reading of the file data D1. The file data D1 is user data whose transfer in file units is controlled by the NAS controller 11. Further, the block OS program P2 is a program for controlling reading of the block data.

The NAS cache memory 112 stores the file data D1. Further, a flash memory 124 stores the file OS program P1, the block OS program P2, and a backup mode program P3. Note that the backup mode program P3 is a program for saving data at the time of a power outage.

It can be seen that, normally, the file OS program P1 and the block OS program P2 which are stored in the flash memory 124 are loaded in the block cache memory 125.

The bottom part of FIG. 2 shows the configuration at the time of a power outage in which power that is being supplied to the storage system 1 is disconnected. At the time of the power outage, save for data saving processing-related control, there is no need to control the file data D1 and the block data D2, and hence there is no need to load the file OS program P1 and the block OS program P2 in the block cache memory 125.

Hence, according to this embodiment, when a power outage occurs, file data D1 is overwritten to and stored in a storage area where the file OS program P1 has been loaded, and the storage mode program P3 overwrites and is loaded in a storage area where the block OS program P2 has been loaded.

By adopting such a configuration, an aggregation destination cache area can be secured at the time of a power outage even when a large-capacity cache memory is not installed at the aggregation destination.

Figure 3:
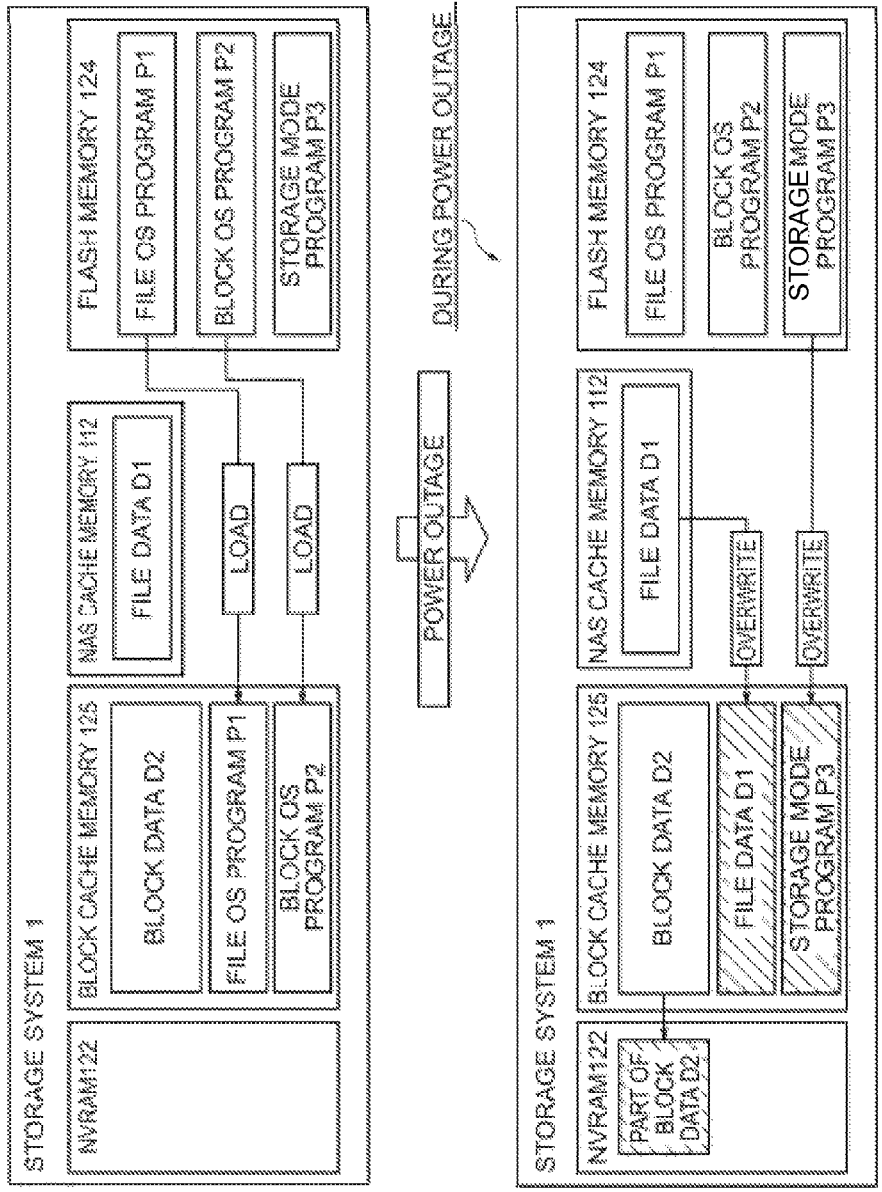
FIG. 3 is a conceptual view illustrating a method of securing a cache area at the time of data saving.

FIG. 3 is a conceptual view illustrating another method of securing a cache area in data saving processing. Here, a method will be described where the cache area is secured in a case where it is not possible to secure a cache area using the method illustrated in FIG. 2.

Here, the top part of FIG. 3 shows a normal configuration where power is being supplied normally to the storage system 1 in the same way as in the top part of FIG. 2. The configuration of the top part of FIG. 3 differs from the configuration of the top part of FIG. 2 in that the size of the file data D1 is greater than the size of the file OS program P1. Therefore, at the time of a power outage, the file data D1 cannot be overwritten as is to the storage area which has been loaded by the file OS program P1.

The lower part of FIG. 3 shows a configuration at the time of a power outage in which the power supplied to the storage system 1 is disconnected in the same way as in the bottom part of FIG. 2. Since the size of the file data D1 is large, the file data D1 cannot be overwritten as is to and stored in the storage area loaded by the file OS program P1. Therefore, here then, a portion of the block data D2 is first saved to the NVRAM 122 and the storage area of the block cache memory 125 is emptied in order to enable the file data D1 to be subsequently saved to the block cache memory 125.

Since the data which is first saved to the NVRAM 122 is not all the block data D2 but rather a portion thereof, it does not take a long time to save this data.

By adopting such a configuration, a cache area at the aggregation destination can be secured at the time of a power outage even when the file data D1 is large in size.

Figure 4:
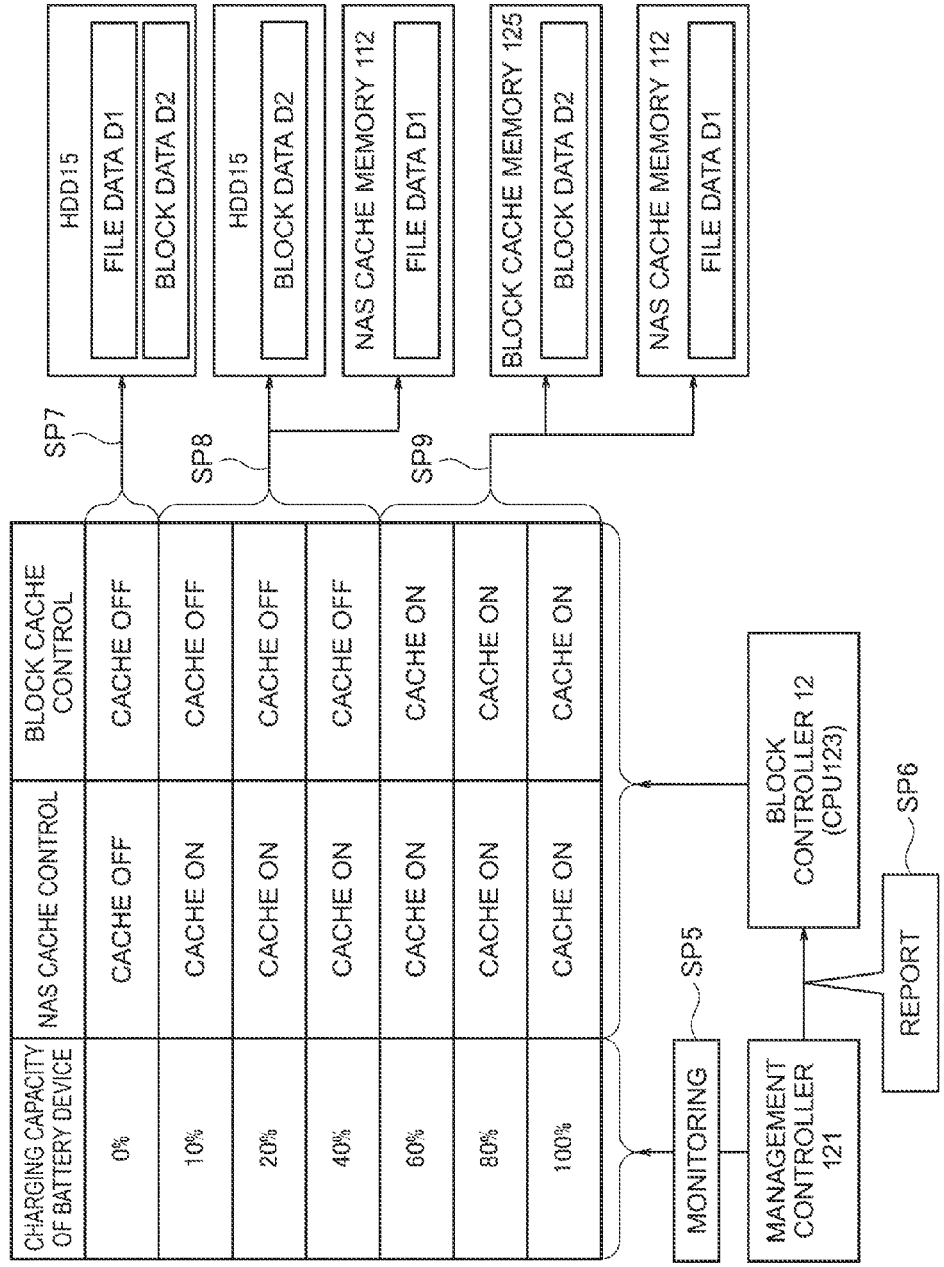
FIG. 4 is a conceptual view illustrating a cache control method at the time of power supply restoration.

FIG. 4 is a conceptual view illustrating a cache control method at the time of power restoration. According to this embodiment, a configuration has been adopted, when saving data at the time of a power outage, in which a plurality of controllers are operated by a power supply from one battery device in order to realize downsizing of the battery device. For this reason, thought has been given to cases where the charging capacity of the battery device directly after data is saved is greatly reduced despite attempts to conserve power. Cases have also been considered in which a power outage occurs once again when dirty data exists in a condition where the charging capacity directly after power supply restoration is greatly reduced, and in which the power supply from the battery device is disconnected until data saving is completed, and data is lost. It is therefore necessary to perform cache control according to the charging capacity of the battery device as soon as power has been restored.

Therefore, the storage system 1 is configured comprising a management controller 121 which monitors the charging capacity of the battery device. When the power is restored, the management controller 121 monitors the charging capacity of the battery device (SP5) and issues a report of the charging capacity of the battery device to the block controller 12 (SP6).

The block controller 12 executes cache control of the NAS cache memory 112 and the block cache memory 125 according to the charging capacity reported by the management controller 121.

More specifically, in a case where the charging capacity of the battery device is 0%, the block controller 12 performs control to turn OFF the cache control for both the file data D1 and also the block data D2 and return an ACK at the moment when writing to the HDD 15 is performed (SP7).

Further, in a case where the charging capacity of the battery device is 10%, for the file data D1, the block controller 12 performs control to turn ON the NAS cache control and return an ACK at the moment when the file data D1 is written in the cache memory 112, whereas, for the block file D2, the block controller 12 performs control to turn OFF the block cache control and return an ACK at the moment when the block file D2 is written to the HDD 15 (SP8).

The reason why only the NAS cache control is turned ON at the stage where the charging capacity is low is because, typically, the file data D1 is smaller in size than the block data D2, and therefore the file data D1 can be suitably saved even in a case where a power outage occurs directly after the NAS cache control is turned ON at a stage when the charging capacity is low.

Further, in a case where the charging capacity of the battery device is 60% or more, the block controller 12 performs control to also turn ON the cache control for the block data D2 and to return an ACK at the moment when the block data D2 is written to the block cache memory 125 (SP9).

Thus, after the power supply has been restored, by executing cache control in stages according to the charging capacity of the battery device, loss of data can be prevented and the performance of the storage system 1 can be improved.

The storage system and data backup method according to this embodiment will be described in detail hereinbelow with reference to the drawings.

(1-2) Overall Configuration

Figure 5:
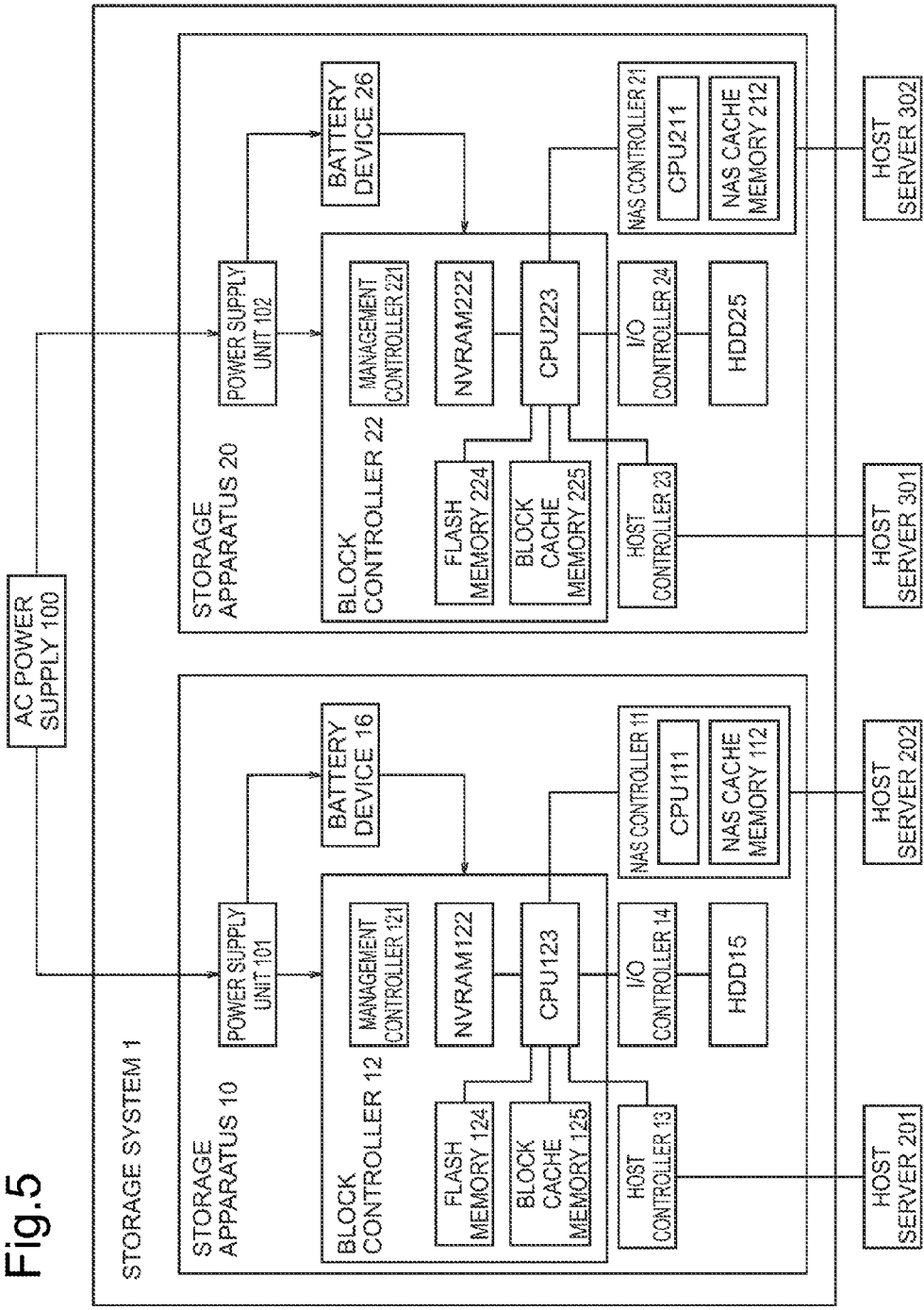
FIG. 5 is a complete constitutional view of a storage system.

FIG. 5 shows the overall configuration of a storage system 1 according to this embodiment. The storage system 1 is a system which is configured by clustering a plurality of storage apparatuses 10 and 20, and operates by means of power supplied from an AC power supply 100.

The storage apparatus 10 is configured from a power supply unit 101, a NAS controller 11, a block controller 12, a host computer controller 13, an I/O controller 14, an HDD (Hard Disk Drive) 15, and a battery device 16.

The power supply unit 101 is a device which converts AC power supplied from the AC power supply 100 and which feeds converted DC power to the storage system 10.

The NAS controller 11 is configured from a CPU (Central Processing Unit) 111 and a NAS cache memory 112. The CPU 111 is a processor which centrally controls the operation of the NAS controller 11. The NAS cache memory 112 is a cache memory used for the NAS controller 11.

Upon receiving write data in file units together with a write request from a host server 202, the NAS controller 11 declares (commits) completion of writing to the host server 202 at the moment when the received write data is written to the NAS cache memory 112. Since the NAS controller 11 comprises the NAS cache memory 112, the response performance in responding to the host server 202 can be improved in comparison with a case where the NAS cache memory 112 is integrated in the block cache memory 125, for example.

The block controller 12 is configured from a management controller 121, an NVRAM 122, a CPU 123, a flash memory 124, and a block cache memory 125.

The management controller 121 continually monitors the environment of the block controller 12 and monitors the power supply state of supplying power to the block controller 12 in particular according to this embodiment. In a case where the power supply is disconnected for any reason, the management controller 121 detects a power outage and issues a request to execute power saving processing to each controller, namely the NAS controller 11, the host computer controller 13, and the I/O controller 14.

The NVRAM 122 is a non-volatile memory capable of retaining stored information even without the supply of power, and is a non-volatile memory for saving data which is stored in the block cache memory 125 upon a power outage.

The CPU 123 is a processor for centrally controlling the operation of the block controller 12. Further, the CPU 123 comprises a program for saving data upon a power outage, and which executes processing to save the data on the basis of this program. Further, the CPU 123 is connected to each of the controllers, namely the NAS controller 11, the host computer controller 13, and the I/O controller 14.

The flash memory 124 is a non-volatile memory which is capable of retaining stored information even without the supply of power, and stores a log (backup log) when data is saved to the NVRAM 122 upon a power outage. By providing the flash memory 124 separately from the NVRAM 122, a backup log can be stored even in a case where the NVRAM 122 fails.

The block cache memory 125 is a cache memory used for the block controller 12. The block cache memory 125 holds various programs and holds a program for saving data upon a power outage, in particular according to this embodiment.

The host computer controller 13 is an interface which is to be connected to a host server 201 and receives read/write requests from the host server 201 and transfers these requests to the CPU 123.

The I/O controller 14 is an interface for a connection with the HDD 15 and reads read data, which corresponds to read requests from the host server 201 or 202, from the HDD 15. Further, the I/O controller 14 writes write data corresponding to the write request to the HDD 15.

The HDD 15 is a storage device configured from one or more HDDs and is a storage device for storing data for long periods.

The battery device 16 is a device which charges during normal operation and which, upon a power outage, serves to supply power to each part which the storage apparatus 10 comprises.

The storage apparatus 20 comprises the same configuration as the foregoing storage apparatus 10 and executes the same operation as the storage apparatus 10, and hence a description is omitted here.

(1-3) Details of Various Information

Figure 6A:
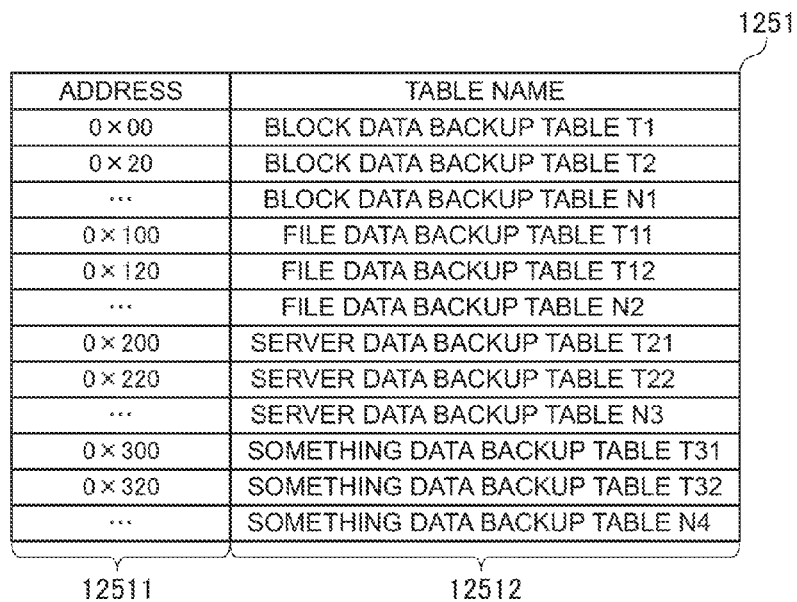
FIG. 6A is a conceptual view of a backup table.
Figure 10C:
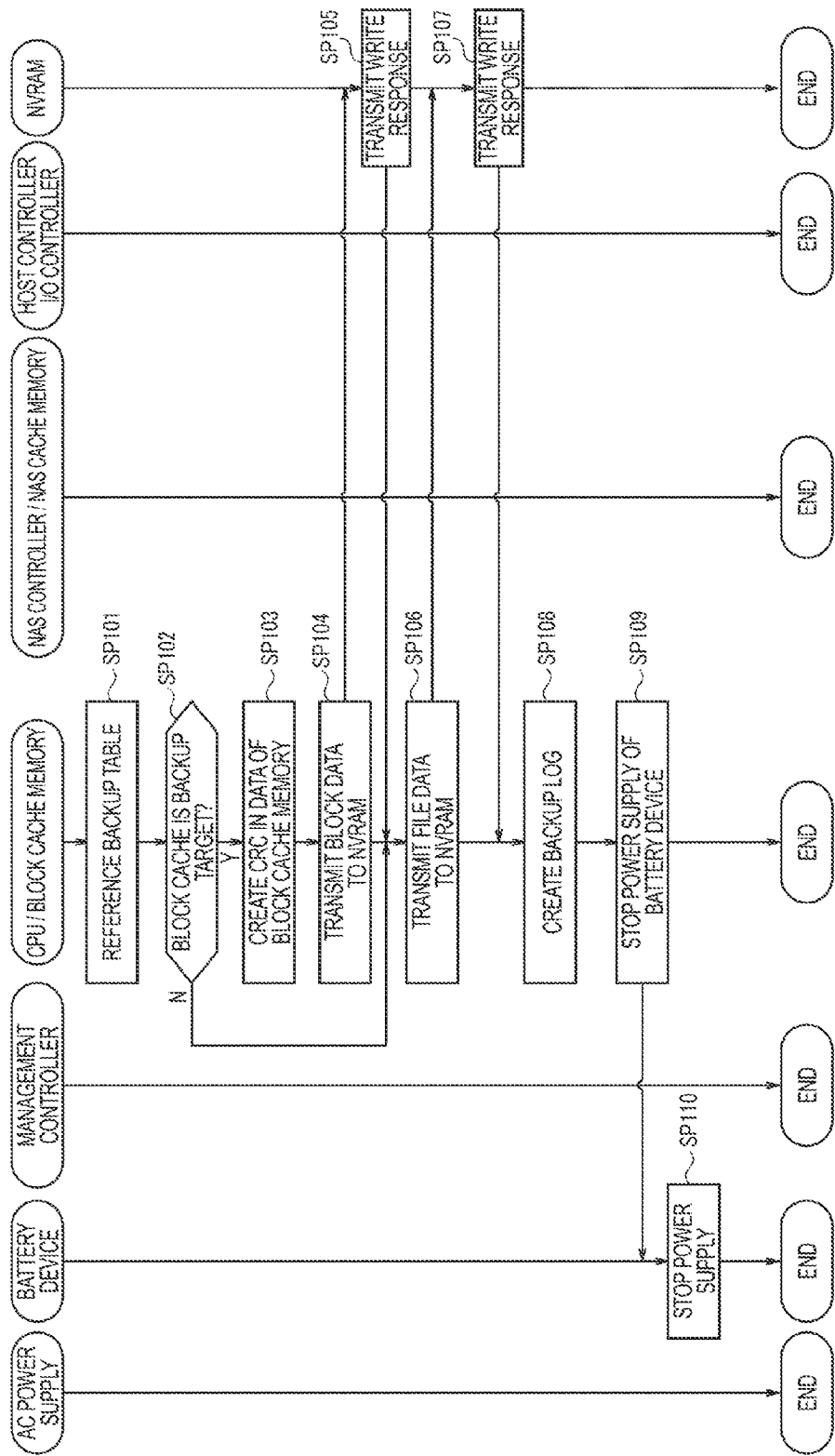
FIG. 10C is a flowchart showing data saving processing upon a power outage.

FIG. 6A is a conceptual view of a backup table 1251. Normally, when power is being supplied normally from the AC power supply 100, the backup table 1251 is created for each type of data saved by the block controller 12 and is stored in the block cache memory 125. The backup table 1251 is used to specify the data which is saved to the NVRAM 122 in the data save processing (FIGS. 10A to 10C).

More specifically, the backup table 1251 is configured from an address field 12511 and a table name field 12512. The address field 12511 stores addresses in the block cache memory 125. Further, the table name field 12512 stores a backup table of names enabling the types of data saved to be specified.

Therefore, in the case of FIG. 6A, it can be seen that a backup table with the name "block data backup table T1" is stored at an address "0x00" in the block cache memory 125, for example, and that the block data backup table T1 is a table which is used when block data is saved.

Figure 6B:
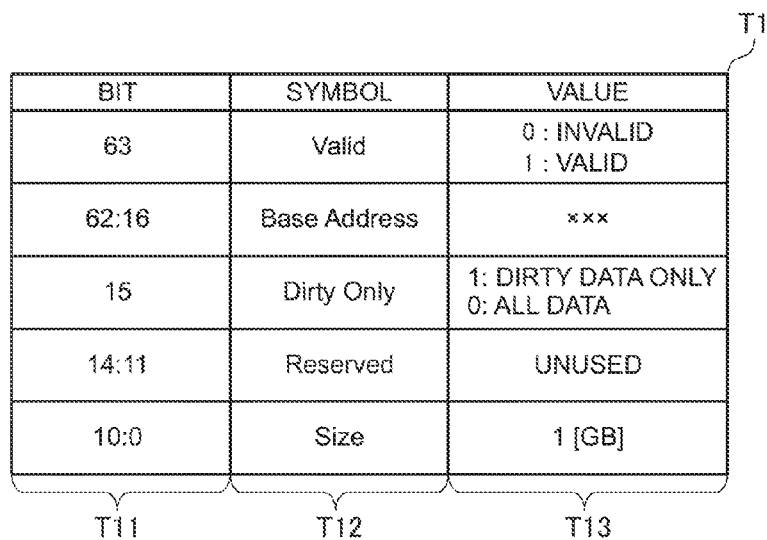
FIG. 6B is a conceptual view of a backup table.

FIG. 6B shows details of the block data backup table T1. The block data backup table T1 is configured from a bit field T11, a symbol field T12, and a value field T13. The bit field T11 stores 63 to 0 bit counts here. The symbol field T12 stores a summary of information stored in the bit. The value field T13 stores values which are stored in the bit.

Therefore, in the case of FIG. 6B, it can be seen that the information "valid" is stored in the bit count "63", and more specifically that either a value "0", which indicates that the block data backup table T1 is invalid, or a value "1", which indicates that the block data backup table T1 is valid, is stored.

Furthermore, it can be seen that the bit count "62:16" stores the information "base address", and more specifically stores a start address of a backup target memory (the block cache memory 125 here).

Furthermore, it can be seen that the bit count "15" stores the information "dirty only", and more specifically that, among the data stored in the block cache memory 125, either a value "1", which indicates that the saved data is only dirty data, or a value "0" indicating that all the data has been saved, is stored. In a case where the saved data is only dirty data, the NVRAM 122 can be downsized. Further, the time taken for data saving processing can be shortened and power can be conserved.

It is also clear that the bit count "14:11" is "reserved", i.e. unused. It can also be seen that the bit count "10:0" stores the information "size", and more specifically that the size of the saved data is stored. For example, in a case where the base address is "0" and "1" is stored as the bit count "10:0", this indicates that 1 GB of data is the volume of data designated for saving.

FIG. 7A shows a conceptual view of a backup log 1221. In a case where data is saved at a time of a power outage when power is being supplied from the battery device 16, the backup log 1221 is created for each type of data saved by the block controller 12, and stored in the NVRAM 122. Further, the backup log 1221 is used to specify data which is restored from the NVRAM 122 in data restoration processing (FIGS. 11A to 11C) at the time of power supply restoration.

More specifically, the backup log 1221 is configured from an address field 12211 and a log name field 12212. The address field 12211 stores addresses in the NVRAM 122. Further, the log name field 12212 stores a backup log of names enabling the types of restored data to be specified.

Therefore, in the case of FIG. 7A, it can be seen that a backup log with the name "block data backup log L1" is stored at an address "0x00" in the NVRAM 122, for example, and that the block data backup log L1 is a table which is used when block data is saved and when the block data is restored.

FIG. 7B shows details of the block data backup log L1. The block data backup log L1 is configured from a bit field L11, a symbol field L12, and a value field L13. The bit field L11 here stores bit counts 63 to 0. The symbol field L12 stores a summary of the information stored in the bits. The value field stores values stored in the bits.

Hence, in the case of FIG. 7B, it can be seen that the bit count "63" stores the information "valid," and more specifically that either a value "0", which indicates that the block data backup log L1 is invalid, or a value "1", which indicates that the block data backup log L1 is valid, is stored.

Furthermore, it can be seen that the bit count "62:16" stores the information "base address". More specifically, the information "base address" is a start address of a backup destination memory (the NVRAM 122 here).

Furthermore, it can be seen that the bit count "15" stores the information "dirty only", and more specifically that, among the data stored in the NVRAM 122, either a value "1", which indicates that the saved data is only dirty data, or a value "0" indicating that all the data has been saved, is stored.

It is also clear that the bit count "14" stores the information "NVRAM", and more specifically that either a value "1", which indicates that the saved data has been stored in the NVRAM 22, or a value "0" which indicates that the saved data exists in the block cache memory 125. A case where "0" is stored is a case where the power supply has been restored during data saving processing and where data has not been stored in the NVRAM 122.

It can be seen that the bit count "13:11" stores "error" information, and more specifically it can be seen that this bit count stores either a value "111" indicating that data specified by this log has failed as a result of an error being generated during the data saving processing, or a value "000" which indicates that the data saving processing completed normally.

It can be seen that the bit count "10:0" stores the information "size", and more specifically it can be seen that this bit count stores the size of the saved data.

(1-4) Flowchart

Figure 8A:
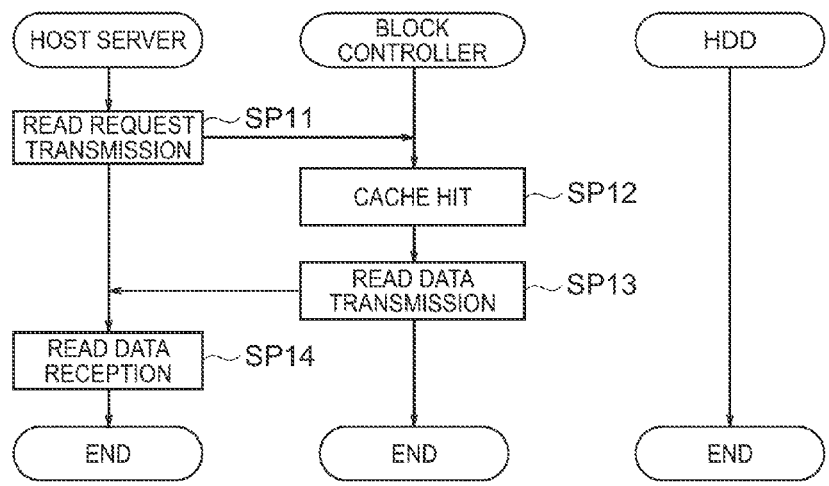
FIG. 8A is a flowchart showing block data read processing.

FIG. 8A shows a processing routine of read processing for reading block data. This read processing is executed by the host server 201 and the block controller 12 in response to a read request being transmitted from the host server 201 to the block controller 12. Note that although, in reality, the read processing is executed by a CPU (not shown) which the host server 201 comprises and by the CPU 123 which the block controller 12 comprises, for the sake of convenience in the description, the entity performing the processing is described as the host server 201 and the block controller 12.

First, the host server 201 transmits a read request to the block controller 12 (SP11). Thereafter, upon receiving the read request from the host server 201, the block controller 12 determines whether or not data (read data) which corresponds to the read request is stored in the block cache memory 125 (a cache hit or a cache miss), and in the case of a cache hit (SP12), reads the read data not from the HDD 15, rather, from the block cache memory 125.

Further, the block controller 12 transmits the read data which has been read from the block cache memory 125 to the host server 201 (SP13). The host server 201 receives read data from the block controller 12 (SP14) and ends the processing.

Figure 8B:
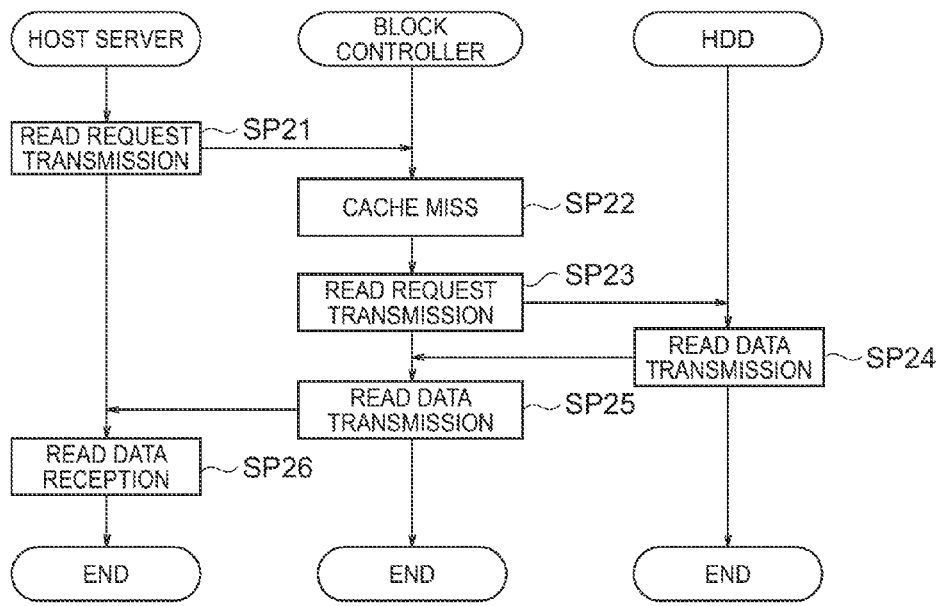
FIG. 8B is a flowchart showing block data read processing.

FIG. 8B shows a processing routine of read processing for reading block data. This read processing differs from the read processing shown in FIG. 8A in that this is read processing in the case of a cache miss where read data is not stored in the block cache memory 125 and in that the HDD 15 is also a processing entity.

This processing is the same as the read processing shown in FIG. 8A up to the point where the host server 201 transmits a read request to the block controller 12 (SP21) and where the block controller 12 determines a cache hit or a cache miss. In the case of a cache miss (SP22), the block controller 12 transmits a read request to the HDD 15 (SP23).

Upon receiving a read request from the block controller 12, the HDD 15 transmits read data corresponding to the received read request to the block controller 12 (SP24). Upon receiving the read data from the HDD 15, the block controller 12 transmits the received read data to the host server 201 (SP25). The host server 201 receives read data from the block controller 12 (SP26) and ends the processing.

Figure 8C:
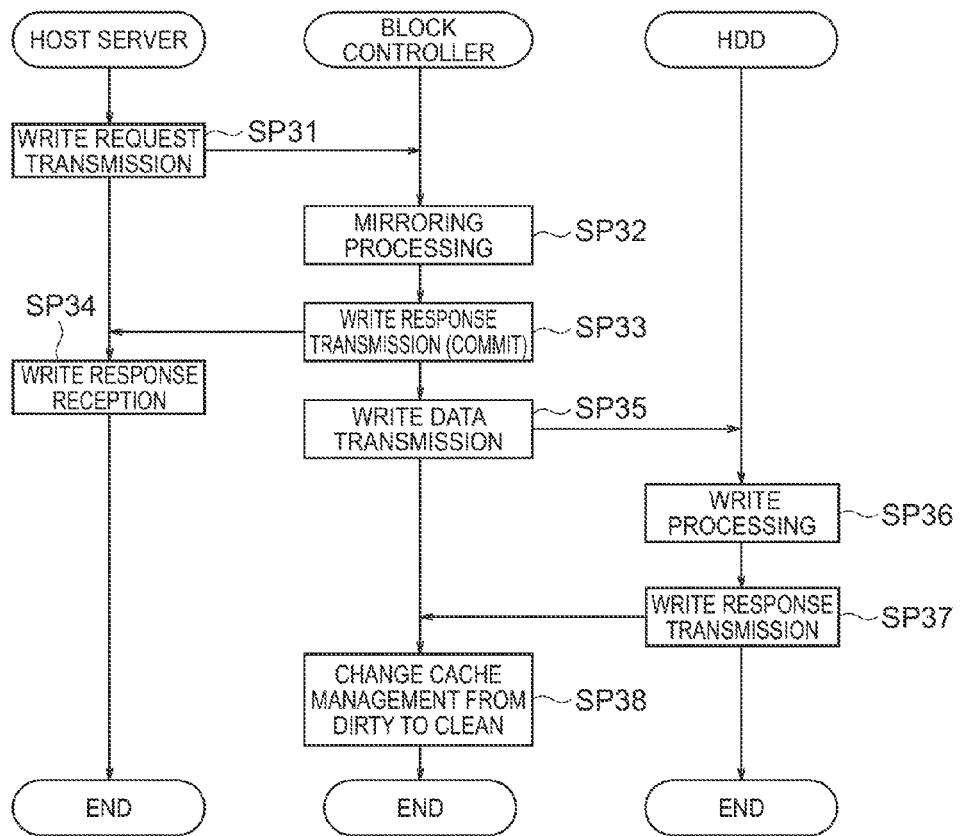
FIG. 8C is a flowchart showing block data write processing.

FIG. 8C shows a processing routine of write processing for writing block data. This write processing is executed by the host server 201, the block controller 12, and the HDD 15 in response to a write request being transmitted from the host server 201 to the block controller 12.

First, the host server 201 transmits a write request to the block controller 12 (SP31). Upon receiving a write request from the host server 201, the block controller 12 writes data corresponding to the write request (write data) to the block cache memory 125 and executes mirroring read processing (SP32).

Here, mirroring processing refers to processing in which write data is written to a block cache memory 225 in the other clustered storage apparatus 20.

Thereafter, the block controller 12 transmits a write response to the host server 201 (SP33). Upon receiving the write response (SP34), the host server 201 determines that the writing is complete although write data has not actually been written to the HDD 15.

The block controller 12 transmits the write data to the HDD 15 asynchronously to transmission of the write response (SP35). Upon receiving the write data from the block controller 12, the HDD 15 executes write processing to write the write data (SP36) and subsequently transmits a write response to the block controller 12 (SP37).

Upon receiving the write response from the HDD 15, the block controller 12 changes the cache management of write data corresponding to this write request from dirty to clean (SP38) and ends the processing.

Figure 9A:
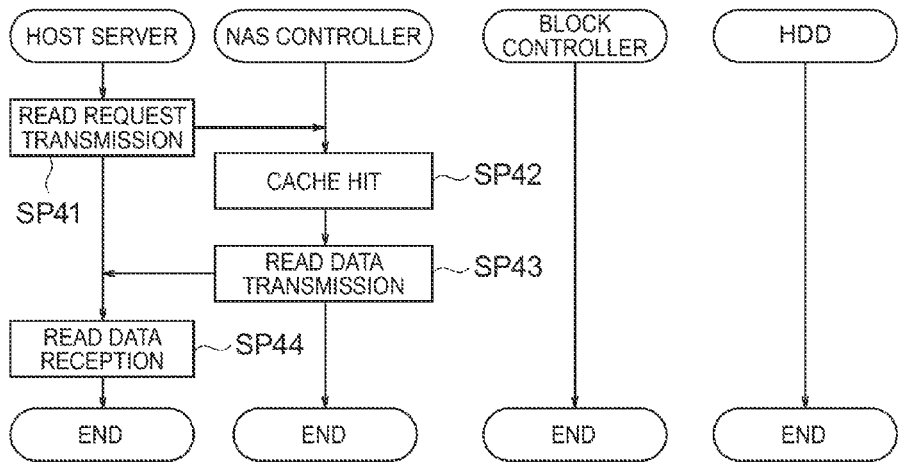
FIG. 9A is a flowchart showing file data read processing.

FIG. 9A shows a processing routine of read processing for reading file data. This read processing is executed by the host server 202 and the NAS controller 11 in response to a read request being transmitted from the host server 202 to the NAS controller 11. Note that, although, in reality, this processing is executed by a CPU (not shown) which the host server 202 comprises and the CPU 111 which the NAS controller 11 comprises, here, for the sake of convenience in the description, the entity performing the processing is described as the host server 202 and the NAS controller 11.

First, the host server 202 transmits a read request to the NAS controller 11 (SP41). Thereafter, upon receiving the read request from the host server 202, the NAS controller 11 determines whether or not the read data corresponding to the read request is stored in the NAS cache memory 112 (cache hit or cache miss), and in the case of a cache hit (SP42), reads the read data from the NAS cache memory 112.

The NAS controller 11 then transmits the read data which has been read from the NAS cache memory 112 to the host server 202 (SP43). The host server 202 receives the read data from the NAS controller 11 (SP44) and ends the processing.

Figure 9B:
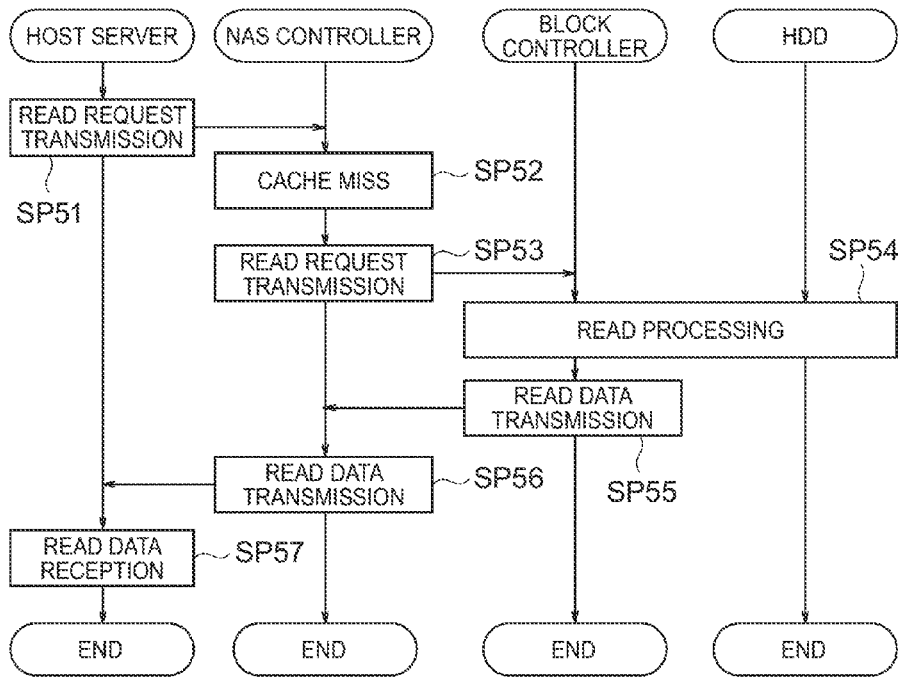
FIG. 9B is a flowchart showing file data read processing.

FIG. 9B shows a processing routine of read processing for reading file data. This read processing differs from the read processing shown in FIG. 9A in that this is read processing in the case of a cache miss where read data is not stored in the NAS cache memory 112 and in that the block controller 12 and the HDD 15 are also processing entities.

This processing is the same as the read processing shown in FIG. 4A up to the point where the host server 202 transmits a read request to the NAS controller 11 (SP51) and where the NAS controller 11 determines a cache hit or a cache miss. In the case of a cache miss (SP52), the NAS controller 11 transmits a read request to the block controller 12 (SP53).

Upon receiving a read request from the NAS controller 11, the block controller 12 executes read processing together with the HDD 15 (SP54), and transmits the read data to the NAS controller 11 (SP55). The read processing (SP54) and the read data transmission processing (SP55) here are the same as the foregoing steps SP12 and SP13 in FIG. 8A and steps SP22 to SP25 in FIG. 8B.

In other words, in a case of a cache hit, the block controller 12 reads the read data from the block cache memory 125 and transmits this data to the NAS controller 11, and in the case of a cache miss, reads the read data from the HDD 15 and transmits this data to the NAS controller 11.

Upon receiving the read data from the block controller 12, the NAS controller 11 subsequently transmits the received read data to the host server 202 (SP56). The host server 202 receives the read data from the NAS controller 11 (SP57) and ends the processing.

Figure 9C:
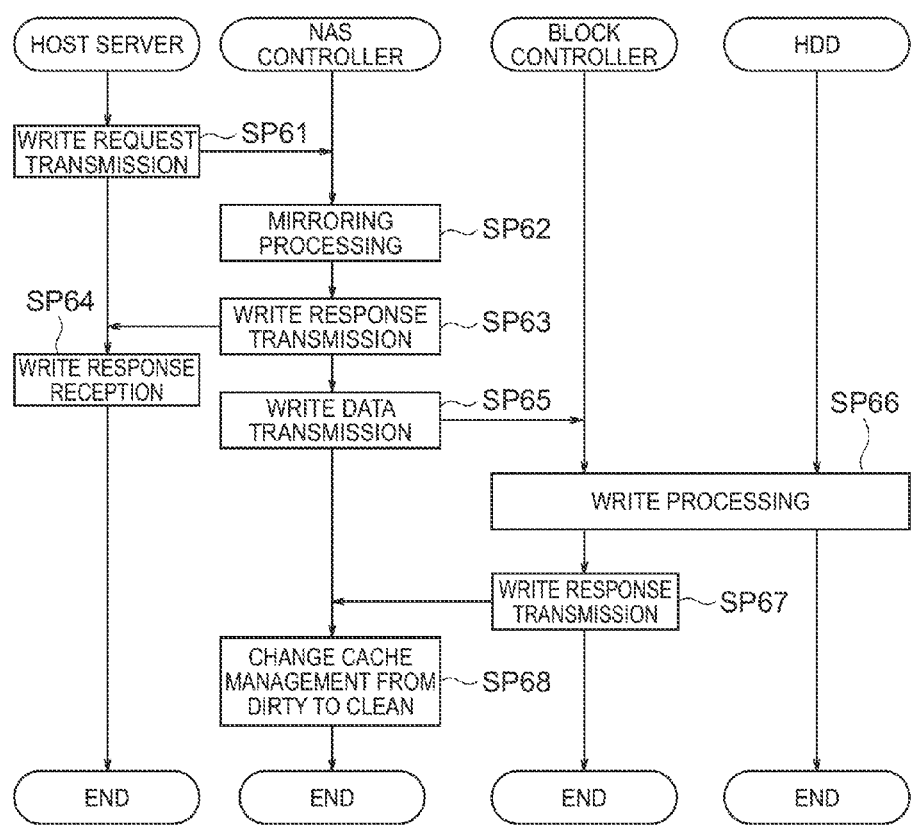
FIG. 9C is a flowchart showing file data write processing.

FIG. 9C shows a processing routine of write processing for writing file data. This write processing is executed by the host server 202, the NAS controller 11, the block controller 12, and the HDD 15 in response to a write request being transmitted from the host server 202 to the NAS controller 11.

First, the host server 202 transmits a write request to the NAS controller 11 (SP61). Upon receiving the write request from the host server 202, the NAS controller 11 writes the write data corresponding to the write request to the NAS cache memory 112 and executes mirroring processing (SP62).

Here, the mirroring processing refers to processing in which write data is also written to a NAS cache memory 212 in the other clustered storage apparatus 20.

Thereafter, the NAS controller 11 transmits a write response to the host server 202 (SP63). Upon receiving the write response (SP64), the host server 202 determines that the writing is complete although write data has not actually been written to the HDD 15.

The NAS controller 11 transmits the write data to the block controller 12 asynchronously to transmission of the write response (SP65). Upon receiving the write data from the NAS controller 11, the block controller 12 executes write processing together with the HDD 15 (SP66) and transmits a write response to the NAS controller 11 (SP67).

Here, the write processing (SP66) and the write response transmission processing (SP67) are the same as the foregoing steps SP35 to SP37 in FIG. 8C. In other words, the block controller 12 writes the write data to the HDD 15 and transmits a write response to the NAS controller 11.

Upon receiving the write response from the block controller 12, the NAS controller 11 changes the cache management of the write data corresponding to the write response from dirty to clean (SP68) and ends the processing.

FIGS. 10A to 10C show a processing routine of data saving processing upon a power outage. This data saving processing is mainly executed by the battery device 16, the block controller 12, and the NAS controller 11 in response to the power supply from the AC power supply 100 being disconnected for whatever reason.

The AC power supply 1000 normally supplies power to each part of the storage apparatus 10 (SP71), and when a power outage occurs, ends the supply of power (SP72). When the power supply from the AC power supply 100 stops and the DC power supply supplied from the power supply unit 101 stops, the battery device 16 starts supplying electric power (SP73).

The management controller 121 continually monitors the state of the power supply supplied to the block controller 12 and, upon detecting that a power outage has occurred (SP74), stops the power supply to configurations pertaining to unused functions other than those functions required for data saving in the block controller 12 and executes power saving processing.

Further, the management controller 121 transmits a power saving request to the NAS controller 11, the host computer controller 13, and the I/O controller 14 so that power saving processing is executed in another controller (SP75).

Upon receiving a power saving request from the management controller 121, the NAS controller 11 executes power saving processing by stopping the power supply to configurations pertaining to unused functions other than those functions required for data saving in the NAS controller 11 (SP76).

In addition, upon receiving a power saving request from the management controller 121, the host computer controller 13 and the I/O controller 14 do not use all the functions in the data saving processing and therefore execute power saving processing by stopping the power supply of the controller itself (SP77).

As a result of each of the controllers executing power saving processing as per the foregoing steps SP74 to SP77, the supply of power required for data saving can be provided for a long time, even in the case of a downsized battery device 16.

After issuing a request for power saving processing to each controller, the management controller 121 issues an interrupt to request the execution of interrupt processing to the CPU 123 (SP78).

The CPU 123 preconfigures the backup table in order to configure a backup (saving) target at the time of a power outage (SP79), and when an interrupt is issued from the management controller 121 in step SP78, the CPU 123 executes interrupt processing (SP80).

More specifically, upon receiving the interrupt, the CPU 123 stops the processing currently being executed and executes a cache flash of the CPU 123, a self-refresh of the block cache memory 125, and a reboot of the block controller 12.

The cache flash of the CPU 123 is processing in which data stored in the cache memory (not shown) of the CPU 123 (also called primary cache and secondary cache) is written to the block cache memory 125. By executing the cache flash, it is possible to prevent loss of data in the CPU 123 in cases where the CPU 123 is rebooted.

The self-refresh of the block cache memory 125 is processing in which the setting of the block cache memory 125 is switched to a self-refresh setting. This self-refresh setting is a setting in which the block cache memory 125 is placed in a power saving state and is setting for retaining data before and after a reboot. By making the self-refresh setting, data can be handed over while retaining the power saving state before and after a reboot in cases where the CPU 123 is rebooted.

In a case where the CPU 123 is configured from a plurality of cores, the reboot of the block controller 12 is executed in order to cause only one core to operate and stop the other cores to establish the power saving state, for example.

In order to bring about execution of the foregoing power saving state using the hardware, the CPU 123 reboots the block controller 12 (SP81) and reboots the CPU 123 (SP82).

Thereafter, the CPU 123 executes power saving processing (SP83). More specifically, the CPU 123 cancels the self-refresh setting after a reboot, and starts up in storage mode. Storage mode is a mode in which, with the exception of a single core among the plurality of cores constituting the CPU 123, the CPU 123 places the other cores in a sleep or reset state and reduces the frequency of the single operating core to reduce the overall power consumed by the CPU 123.

Thereafter, the CPU 123 determines whether or not the power supply has been restored by the management controller 121 (SP84). When an affirmative result is attained in this determination, the CPU 123 cancels the power saving state by activating all the cores constituting the CPU 123 and normalizing the frequency of the CPU 123 (SP85).

Thereafter, the CPU 123 confirms the capacity of the battery device 16 and creates a backup log in cases where capacity sufficient to enable a single storage remains (SP86). The CPU 123 subsequently boots the OS (SP87) and ends the processing.

Note that the reason why the capacity of the battery device 16 is confirmed and the OS is booted is in order to be able to handle another power outage.

However, upon obtaining a negative result in the determination of step SP84, the CPU 123 starts storage processing (SP88). First, the CPU 123 references the backup table (SP89) and determines whether or not the data stored in the NAS cache memory 112 is the backup target (SP90).

Upon obtaining a negative result in the determination of step SP90, the CPU 123 moves to step SP93. However, upon obtaining an affirmative result in the determination of step SP90, the CPU 123 transmits a read request to the NAS controller 11.

Upon receiving a read request from the CPU 123, the NAS controller 11 appends a security code such as a CRC (Cyclic Redundancy Check) to the backup target data among the file data which is stored in the NAS cache memory 112, and transmits this data to the block cache memory 125 (SP91).

The purpose behind appending the security code to the data transmitted by the NAS controller 11 is to detect data failure at the time of data transmission and data failure in the NVRAM 122.

The CPU 123 writes the data from the NAS controller 11 to the block cache memory 125 and copies the data of the NAS cache memory 112 to the block cache memory 125 (SP92).

The CPU 123 appends the security code to the data when the data of the NAS cache memory 112 is copied to the block cache memory 125. A security code has already been appended to the data by the NAS controller 11 as mentioned earlier, but the CPU 123 appends the security code by taking the already appended security code and data as a block of data The purpose behind the CPU 123 further appending the security code is to enable a determination of whether data has failed during data transmission from the NAS controller 11 or whether data has failed in the NVRAM 122.

The CPU 123 determines whether the copying of the backup target data stored in the NAS cache memory 112 is complete (SP93). Upon obtaining a negative result in this determination, the CPU 123 returns to step SP92 to repeat the copying.

However, upon obtaining an affirmative result in the determination of step SP93, the CPU 123 instructs that the power supply to the NAS controller 11 be stopped in order to achieve power saving (SP94). Upon receiving this power supply stoppage instruction, the NAS controller 11 stops the power supply (SP95).

The CPU 123 then creates a backup log and stores the created backup log in the flash memory 124 (SP96).

Thereafter, the CPU 123 determines whether or not the power supply has been once again restored (SP97). Upon obtaining an affirmative result in this determination, the CPU 123 cancels the power saving state in the same way as in the foregoing steps SP85 to SP87 (SP98), creates a backup log and stores this log in the flash memory 124 (SP99), boots the OS (SP100), and ends the processing.

However, upon obtaining a negative result in the determination of step SP97, the CPU 123 references the backup table (SP101), and determines whether or not the data which is stored in the block cache memory 125 is a backup target (SP102).

Upon obtaining a negative result in the determination of step SP102, the CPU 123 moves to step SP106. However, upon obtaining an affirmative result in the determination of step SP102, the CPU 123 appends a security code such as a CRC to the backup target data among the block data stored in the block cache memory 125 (SP103), and transmits the data to the NVRAM 122 (SP104).

The NVRAM 122 stores the block data from the block cache memory 125 before then transmitting a write response to the CPU 123 (SP105).

Further, the CPU 123 transmits the file data of the backup target stored in the block cache memory 125 to the NVRAM 122 (SP106).

After storing the file data from the block cache memory 125, the NVRAM 122 transmits a write response to the CPU 123 (SP107).

After transmitting all the backup target data stored in the block cache memory 125 to the NVRAM 122, the CPU 123 creates a backup log and stores the backup log in the flash memory 124 (SP108).

The CPU 123 then issues an instruction to the battery device 16 to stop the power supply (SP109). Upon receiving the power supply stoppage instruction from the CPU 123, the battery device 16 stops the power supply (SP110), and ends the processing.

Figure 11A:
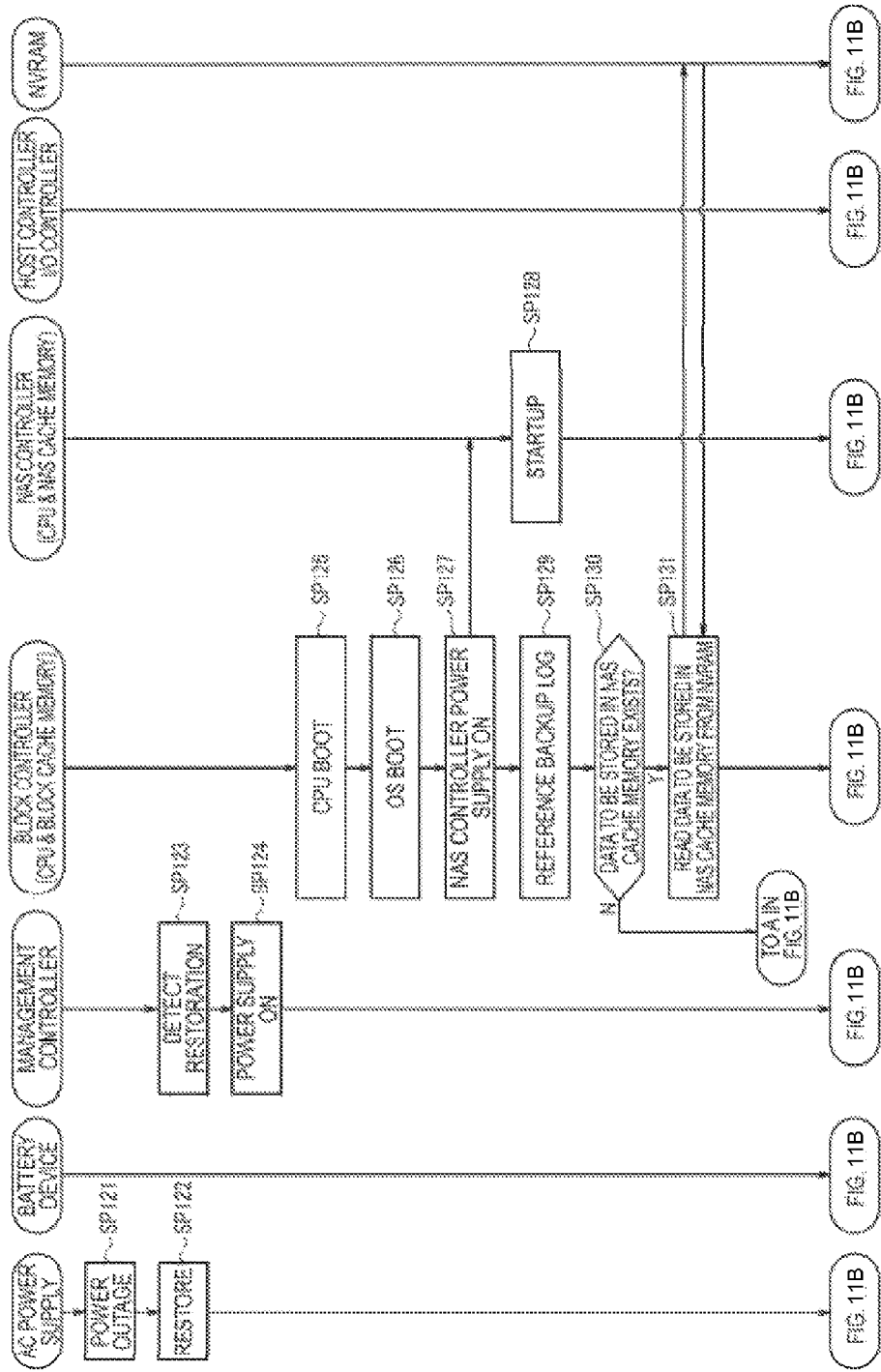
FIG. 11A is a flowchart showing data restoration processing upon a power outage.

FIGS. 11A to 11C show processing routines of data restoration processing during power supply restoration. The data restoration processing is mainly executed by the block controller 12 in response to the power supply being restored after a power outage.

The AC power supply 100 does not supply power at the time of a power outage (SP121), rather, the AC power supply 100 starts supplying electric power at the time of power outage restoration (SP122). Upon detecting power outage restoration (SP123), the management controller 121 turns ON the power supply of the block controller 12 (SP124).

When the power supply is turned ON, the CPU 123 first boots the CPU 123 (SP125), and then boots the OS (SP126). Further, the CPU 123 turns ON the power supply of the NAS controller 11 (SP127). The NAS controller 11 executes activation processing when the power supply is turned ON (SP128).

The CPU 123 then references a backup log which is stored in the flash memory 124 (SP129) and determines whether there is data which is stored in the NAS cache memory 112 (SP130).

Upon obtaining a negative result in the determination of step SP130, the CPU 123 moves to step SP135. However, upon obtaining an affirmative result in the determination of step SP130, the CPU 123 transmits a read request to the NVRAM 122 and reads the data restored to the NAS cache memory 112 from the NVRAM 122 (SP131).

Note that, in the processing of step SP131, the CPU 123 does not read all the restoration target data from the NVRAM 122 at the same time, rather, the data may be read in parts. By reading the data in parts, this prevents the storage area of the block cache memory 125 which serves as the read destination from being full of restoration target data.

The CPU 123 sequentially writes the restoration target data thus read from the NVRAM 122 to the NAS cache memory 112 (SP132). When data is written to the NAS cache memory 112, the NAS controller 11 checks the CRC to determine whether the data has failed (SP133). The NAS controller 11 subsequently transmits the CRC check result to the CPU 123.

The CPU 123 receives a CRC check result (SP134) and confirms that the data has not failed. In a case where a check result to the effect that data has failed is obtained, the CPU 123 reads the restoration target data to be restored to the NAS cache memory 112 from a NVRAM 222 of the storage apparatus 20 executing the same processing as the storage apparatus 10, and writes the data thus read to the NAS cache memory 112 (see FIG. 11D).

The CPU 123 subsequently references the backup log (SP135) and determines whether or not there exists data to be restored to the block cache memory 125 (SP136).

Upon obtaining a negative result in the determination of step SP136, the CPU 123 moves to step SP140. However, when an affirmative result is obtained in the determination of step SP136, the CPU 123 transmits a read request to the NVRAM 122 and reads the data to be restored to the block cache memory 125 from the NVRAM 122 (SP137).

Subsequently, the CPU 123 checks the CRC of the data read from the NVRAM 122 (SP138) and checks that the data has not failed. In cases where the data has failed, the CPU 123 reads the restoration target data to be restored to the block cache memory 125 from the NVRAM 22 of the storage apparatus 20, and writes the read data to the block cache memory 125 (see FIG. 11D).

The CPU 123 subsequently configures a backup table in preparation for the next power outage (SP139), and deletes the backup logs (SP140). The purpose of deleting the backup logs is to avoid data of the NVRAM 122 being restored by mistake at the time of booting after the power supply has been turned OFF during normal operation without a power outage.

The CPU 123 then deletes data which has been stored in the NVRAM 122 (SP141) and ends the processing.

Note that the purpose of deleting data which is stored in the NVRAM 122 is because of a security problem which arises due to the user data also being extracted if also extracted by the block controller 12 when the block controller 12 holds the user data as is.

FIG. 11D shows a processing routine of data restoration processing at the time of a data failure. This data restoration processing is executed in a case where the CRC check result confirms a data failure in step SP134 or SP138 in FIG. 11B.

First, the CPU 123 checks the CRC of the restoration target data (SP151) and determines whether or not the CRC is normal (SP152). Upon obtaining an affirmative result in this determination, the CPU 123 ends this processing. However, upon obtaining a negative result in this determination, the CPU 123 issues a request for normal data to another block controller 22 (SP153).

A CPU 223 of another block controller 22 transmits normal data corresponding to the request to the CPU 123 (SP154) and ends the processing.

(1-5) Advantageous Effects of Embodiment

As mentioned earlier, the storage system 1 according to this embodiment is configured such that the plurality of controllers do not each individually save data from cache memory to non-volatile memory, the saved data is aggregated in a cache memory which one controller comprises and the aggregated data is batch-saved to one non-volatile memory, while the power supplies of the other controllers for which data saving to one controller is complete are sequentially stopped, and therefore the time and amount of electric power required to perform saving to the non-volatile memory can be reduced.

Accordingly, the present embodiment enables the battery device installed in the storage system 1 to be downsized.

(2) Second Embodiment

A second embodiment differs from the first embodiment as a result of being configured comprising a plurality of other controllers for saving data to one controller. Details on the differences will be provided hereinbelow using the drawings.

(2-1) Overall Configuration

Figure 12:
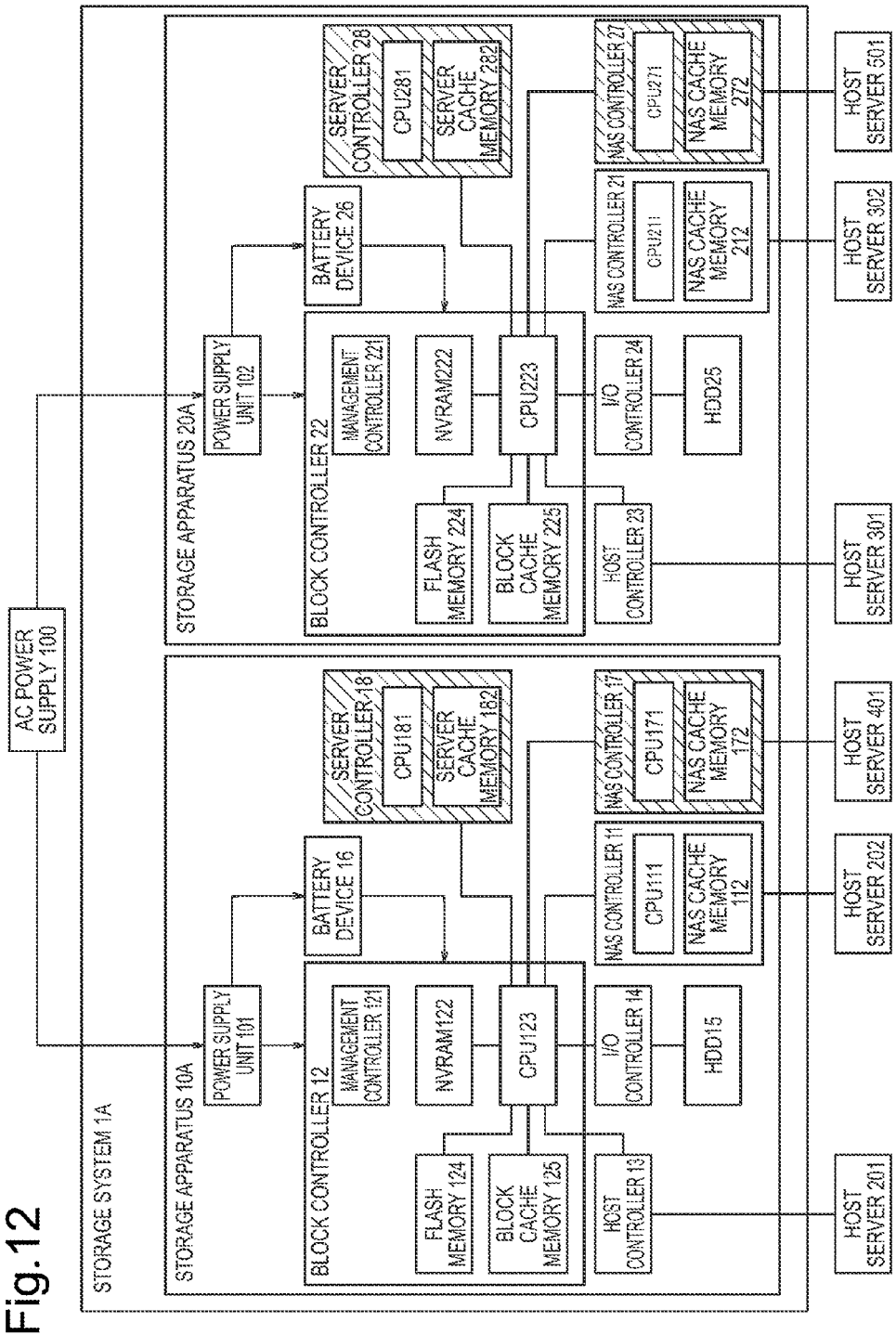
FIG. 12 is an overall constitutional view of the storage system according to a second embodiment.

FIG. 12 shows the overall configuration of a storage system 1A according to the second embodiment. The storage system 1A differs from the first embodiment in that a NAS controller 17 and a server controller 18 have been added to a storage apparatus 10A and in that a NAS controller 27 and a server controller 28 have been added to a storage apparatus 20A.

Similarly to the NAS controller 11, the NAS controller 17 in the storage apparatus 10A is configured comprising a CPU 171 and a NAS cache memory 172. Further, the server controller 18 is likewise also configured comprising a CPU 181 and a server cache memory 182.

The server controller 18 writes server data separately from block data and file data to the server cache memory 182 and, in data saving processing, transmits the data stored in the server cache memory 182 to the block cache memory 125. Accordingly, a plurality of individual data is aggregated in the block cache memory 125. The aggregated data is batch-saved to the NVRAM 122 by the block controller 12.

The storage apparatus 20A comprises the same configuration as the foregoing storage apparatus 10A and executes the same operation as the storage apparatus 10A, and hence a description thereof is omitted here.

(2-2) Details of Various Information

Figure 13:
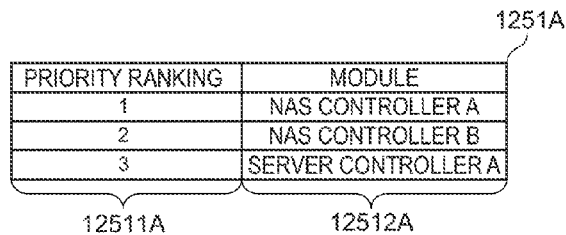
FIG. 13 is a conceptual view of a priority table.

FIG. 13 shows a conceptual view of a priority table 1251A. The priority table 1251A is pre-stored in the block cache memory 125 and an aggregation order when aggregating data in the block cache memory 125 in the data saving processing (FIG. 14) is defined.

More specifically, the priority table 1251A is configured from a priority ranking field 12511A and a module field 12512A. The priority ranking field 12511A stores the order when data is saved to the block cache memory 125. The module field 12512A stores identification information for the other controllers except for the block controller 12 which is the aggregation destination.

Therefore, in the case of FIG. 13, it can be seen that, in data saving processing, data which is held by an "NAS controller A" with priority ranking "1" is first saved to the block cache memory 125, data which is held by an "NAS controller B" with priority ranking "2" is then saved to the block cache memory 125, and data which is held by a "server controller A" with priority ranking "3" is finally saved to the block cache memory 125.

Note that the priority ranking defined in the priority table 1251A is in order of cache memory starting with the cache memory of the smallest capacity. In other words, here, the capacity of the cache memory in the "NAS controller A" is the smallest, followed by the cache memory capacity of the "NAS controller B", then the "server controller A".

The purpose behind defining the priority ranking according to the small size of the cache memory capacity is to seek power saving by stopping the power supply of a controller which holds the data by first saving data of a small capacity to the block cache memory 125 of the aggregation destination. Assuming that data of a large capacity is to be saved first to the block cache memory 125 of the aggregation destination, processing to write a portion of the data of the block cache memory 125 to the NVRAM 122 is generated in order to secure unused capacity in a case where there is no unused capacity in the block cache memory 125. Accordingly, there is a proportionate increase in the time taken to perform the data saving and power saving cannot be achieved.

Figure 14:
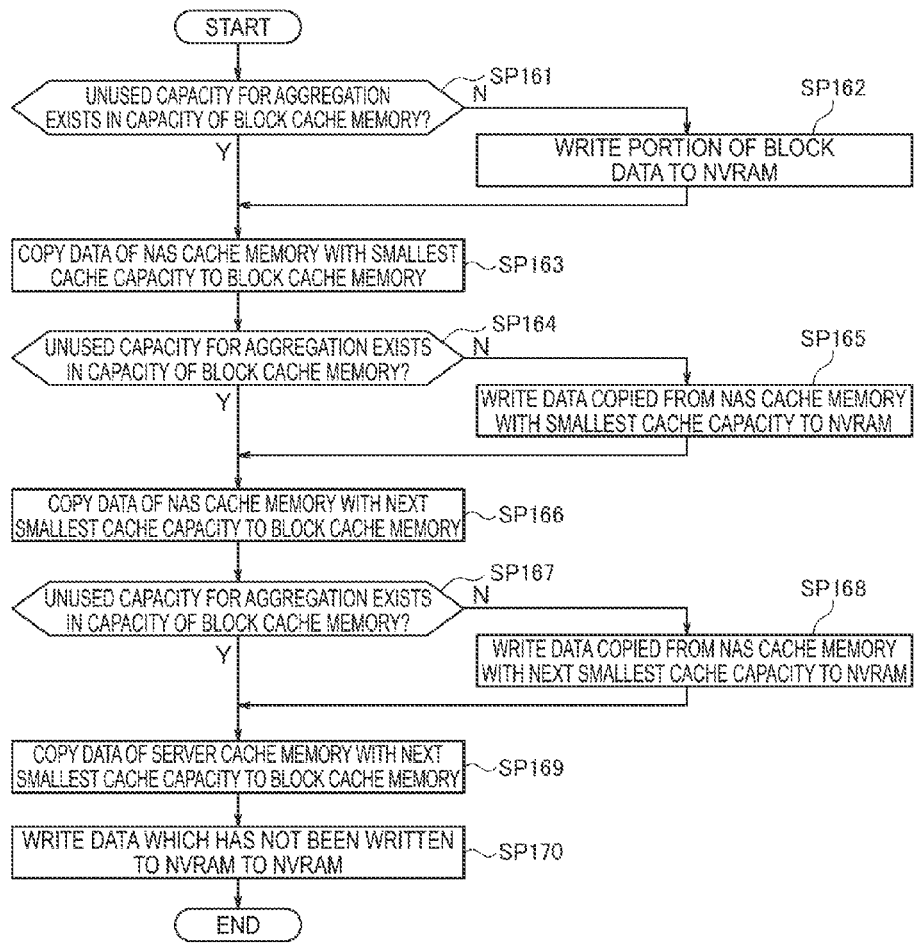
FIG. 14 is a flowchart showing data saving processing upon a power outage.

FIG. 14 shows a processing routine of data saving processing upon a power outage. This data saving processing is mainly executed by the block controller 12 in response to the power supply from the AC power supply 100 being disconnected for whatever reason.

First, the block controller 12 determines whether or not there is unused capacity for aggregating file data and server data in the capacity of the block cache memory 125 (SP161). Upon obtaining a negative result in this determination, the block controller 12 writes a portion of the block data to the NVRAM 122 and secures unused capacity for aggregation (SP162).

However, upon obtaining an affirmative result in the determination of step SP161 or securing unused capacity in step SP162, the block controller 12 references the priority table 1251A and copies data of the NAS cache memory with the smallest cache memory capacity (the NAS cache memory 112, for example) to the block cache memory 125 (SP163).

The block controller 12 then determines whether or not there exists unused capacity in the capacity of the block cache memory 125 after copying the data of the NAS cache memory 112 to the block cache memory 125 (SP164).

Upon obtaining a negative result in the determination of step SP164, the block controller 12 writes the data copied to the block cache memory 125 from the NAS cache memory 112 in step SP163 to the NVRAM 112 and secures unused capacity for aggregation (SP165).

However, when an affirmative result is obtained in the determination of step SP164 or unused capacity is secured in step SP165, the block controller 12 references the priority table 1251A and copies data of the NAS cache memory with the next smallest cache memory capacity (the NAS cache memory 172, for example) to the block cache memory 125 (SP166).

Thereafter, the block controller 12 determines whether or not there is unused capacity in the capacity of the block cache memory 125 after copying the data of the NAS cache memory 172 to the block cache memory 125 (SP167).

Upon obtaining a negative result in the determination of step SP167, the block controller 12 writes data which has been copied to the block cache memory 125 from the NAS cache memory 172 in step SP166 to the NVRAM 112 and secures unused capacity for aggregation (SP168).

However, upon obtaining an affirmative result in the determination of step SP167, or upon securing unused capacity in step SP168, the block controller 12 references the priority table 1251A and copies data of the server cache memory 182 with the next smallest cache memory capacity to the block cache memory 125 (SP169).

Subsequently, the block controller 12 writes data which has not been written to the NVRAM 112 among the data stored in the block cache memory 125 at the present time to the NVRAM 112 (SP170), and ends the processing.

(2-3) Advantageous Effects of the Second Embodiment

With the second embodiment as described above, in a storage system 1A which is configured comprising one controller which aggregates data at the time of data saving processing and a plurality of other controllers which save data in the one controller, since data is saved to order of controllers starting with the controller comprising the smallest cache memory capacity in a case where data is saved to one controller from another controller, the time and electric power required for the data saving can be reduced. Accordingly, the battery device installed in the storage system 1A can be downsized.

REFERENCE SIGNS LIST

1 Storage system
10 Storage apparatus
11 NAS controller
111 CPU
112 NAS cache memory
12 Block controller
121 Management controller
122 NVRAM
123 CPU
124 Flash memory
125 Block cache memory
13 Host controller
14 I/O controller
15 HDD
16 Battery device

The invention claimed is:
1. A storage system which is connected to a host computer, comprising:
    a storage device;
    a first controller which comprises a first volatile memory and which controls data transfers between the storage device and the host computer;
    a second controller which is connected to the first controller and which comprises a second volatile memory and controls, together with the first controller, the data transfers between the storage device and the host computer;

a non-volatile memory; and a battery device, wherein, upon a power outage, the battery device starts supplying electric power to the first controller and the second controller, and wherein the second controller copies data which is stored in the first volatile memory to the second volatile memory and, after copying is complete, stops operation of the first controller, stops the power supply from the battery device to the first controller, and stores data, which is stored in the second volatile memory, in the non-volatile memory.

2. The storage system according to claim 1, wherein the first controller manages first data whose storage in the storage device is not complete among the data stored in the first volatile memory, wherein the second controller manages second data whose storage in the storage device is not complete among the data stored in the second volatile memory, and wherein, upon a power outage, the second controller copies the first data managed by the first controller among the data stored in the first volatile memory to the second volatile memory, and after the copying is complete, stops the operation of the first controller, stops the power supply from the battery device to the first controller, and stores the first data and the second data, which are stored in the second volatile memory, in the non-volatile memory.

3. The storage system according to claim 2, wherein, upon a power outage, the second controller compares a capacity of a second storage area which differs from a first storage area which stores the second data in the second volatile memory, with a capacity of the first data, wherein, if the capacity of the second storage area is smaller than the capacity of the first data, the second controller stores at least a portion of the second data in the non-volatile memory, and wherein the second controller copies the first data stored in the first volatile memory to the second storage area of the second volatile memory and to a third storage area which stores at least a portion of the second data.

4. The storage system according to claim 3, wherein, upon a power outage, the second controller stops control of data transfers between the storage device and the host computer, and the second storage area stores a program for storing data, which is stored in the second volatile memory, in the non-volatile memory.

5. The storage system according to claim 1, wherein the second controller is also connected to a third controller which comprises a third volatile memory and controls, together with the second controller, the data transfers between the storage device and the host computer, wherein, upon a power outage, the battery device further starts supplying electric power to the third controller, wherein the second controller compares a capacity of the first volatile memory with a capacity of the third volatile memory, and if, as a result of this comparison, the capacity of the third volatile memory is smaller than the capacity of the first volatile memory, the second controller copies data stored in the third volatile memory to the second volatile memory and, after the copying is complete, the second controller stops the operation of the third controller and stops the power supply from the battery device to the third controller, wherein thereafter, the second controller performs the copying the data stored in the first volatile memory to the second volatile memory, and after the copying is complete, performs the stopping the operation of the first controller and the stopping the power supply from the battery device to the first controller, and wherein the second controller stores the data, which is stored in the second volatile memory, in the non-volatile memory.

6. The storage system according to claim 1, wherein the first controller is connected to the host computer and performs control such that, upon receiving a first write request from the host computer, the first controller stores first write data contained in the first write request in the first volatile memory, and after transmitting a write completion notification to the host computer, stores the first write data stored in the first volatile memory in the storage device via the second controller, and wherein the second controller is connected to another host computer which differs from the host computer connected to the first controller and, upon receiving a second write request from the other host computer, stores second write data contained in the second write request in the second volatile memory, and after transmitting a write completion notification to the other host computer, stores the second write data stored in the second volatile memory in the storage device.

7. The storage system according to claim 6, wherein, upon a power outage, the first controller appends a security code to the data stored in the first volatile memory before the data stored in the first volatile memory is copied to the second volatile memory by the second controller, wherein, at a time when power is restored, the second controller stores the data copied from the first volatile memory to the second volatile memory at the time of the power outage among the data read from the non-volatile memory, in the first volatile memory, and wherein the first controller determines whether or not the data stored in the first volatile memory is normal data on the basis of the security code.

8. The storage system according to claim 1, wherein the second controller comprises a processor, which comprises a plurality of cores for controlling the operation of the second controller, and, upon a power outage, stops operations of certain processor cores among the plurality of processor cores.

9. A data backup method of a storage system which is connected to a host computer, the storage system comprising a storage device for storing data; a first controller which controls data transfers between the storage device and the host computer via a first volatile memory; a second controller which is connected to the first controller and controls, together with the first controller, the data transfers between the storage device and the host computer, via a second volatile memory; a non-volatile memory;

and a battery device, the backup method comprising:

upon a power outage, a first step in which the battery device starts supplying electric power to the first controller and the second controller; and a second step in which the second controller copies data which is stored in the first volatile memory to the second volatile memory and, after copying is complete, stops operation of the first controller, stops the power supply from the battery device to the first controller, and stores data, which is stored in the second volatile memory, in the non-volatile memory.

10. The data backup method according to claim 9, further comprising:
a third step in which the first controller manages first data whose storage in the storage device is not complete among the data stored in the first volatile memory; and a fourth step in which the second controller manages second data whose storage in the storage device is not complete among the data stored in the second volatile memory,
wherein, in the second step,
the second controller copies the first data managed by the third step among the data stored in the first volatile memory to the second volatile memory, and after the copying is complete, stops operation of the first controller, stops supplying power from the battery device to the first controller, and stores the first data, which is stored in the second volatile memory, and the second data, which is managed by the fourth step, in the non-volatile memory.

11. The data backup method according to claim 10,
wherein, in the second step,
the second controller compares a capacity of a second storage area which differs from a first storage area which stores the second data in the second volatile memory, with the capacity of the first data,
wherein, if the capacity of the second storage area is smaller than the capacity of the first data, the second controller stores at least a portion of the second data in the non-volatile memory, and
wherein the second controller copies the first data stored in the first volatile memory to the second storage area of the second volatile memory and to a third storage area which stores at least a portion of the second data.

12. The data backup method according to claim 11,
wherein, in the second step,
the second controller stops control of data transfers between the storage device and the host computer, and the second storage area stores a program for storing data, which is stored in the second volatile memory, in the non-volatile memory.

13. The data backup method according to claim 9,
wherein the second controller is connected to a third controller which controls, together with the second controller, the data transfers between the storage device and the host computer via a third volatile memory,
wherein, in the first step,
the battery device further starts supplying electric power to the third controller,
wherein, in the second step,
the second controller compares the capacity of the first volatile memory with the capacity of the third volatile memory, and if, as a result of this comparison, the capacity of the third volatile memory is smaller than the capacity of the first volatile memory, the second controller copies data stored in the third volatile memory to the second volatile memory and, after the copying is complete, the second controller stops the operation of the third controller and stops the power supply from the battery device to the third controller,
wherein thereafter, the second controller performs the copying the data stored in the first volatile memory to the second volatile memory, and after the copying is complete, performs the stopping the operation of the first controller and the stopping the power supply from the battery device to the first controller, and
wherein the second controller stores the data, which is stored in the second volatile memory, in the non-volatile memory.

14. The data backup method according to claim 9, further comprising:
a fifth step in which the first controller performs control such that, upon receiving a first write request from the host computer, the first controller stores first write data contained in the first write request in the first volatile memory, and after transmitting a write completion notification to the host computer, stores the first write data stored in the first volatile memory in the storage device via the second controller; and
a sixth step in which the second controller performs control such that, upon receiving a second write request from another host computer which differs from the host computer connected to the first controller, the second controller stores second write data contained in the second write request in the second volatile memory, and after transmitting a write completion notification to the other host computer, stores the second write data stored in the second volatile memory in the storage device.

15. The data backup method according to claim 14,
wherein, in the second step,
the first controller appends a security code to the data stored in the first volatile memory before the data stored in the first volatile memory is copied to the second volatile memory by the second controller,
the data backup method further comprising:
a seventh step in which, at a time when power is restored, the second controller stores the data copied from the first volatile memory to the second volatile memory at the time of the power outage among the data read from the non-volatile memory, in the first volatile memory; and
an eighth step in which the first controller determines whether or not the data stored in the first volatile memory is normal data on the basis of the security code.

* * * * *